United States Patent
Sano et al.

(10) Patent No.: US 7,464,236 B2
(45) Date of Patent: *Dec. 9, 2008

(54) STORAGE SYSTEM AND STORAGE MANAGEMENT METHOD

(75) Inventors: Kazuhide Sano, Fujinomiya (JP);
Katsuhiro Okumoto, Odawara (JP);
Hisao Honma, Odawara (JP); Kenta Ninose, Yokohama (JP); Hiroshi Arakawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 11/259,087

(22) Filed: Oct. 27, 2005

(65) Prior Publication Data

US 2007/0050547 A1 Mar. 1, 2007

(30) Foreign Application Priority Data

Aug. 25, 2005 (JP) ............................. 2005-243568

(51) Int. Cl.
*G06F 12/00* (2006.01)
*G06F 12/16* (2006.01)

(52) U.S. Cl. ...................... 711/162; 711/114; 711/165; 707/204; 714/6

(58) Field of Classification Search ................. 711/100, 711/112, 114, 161, 162, 165; 707/204; 714/6, 714/7

See application file for complete search history.

(56) References Cited

U.S. PATENT DOCUMENTS

| 2004/0267829 | A1* | 12/2004 | Hirakawa et al. ........... 707/200 |
| 2005/0055523 | A1 | 3/2005 | Suishu et al. |
| 2005/0132155 | A1* | 6/2005 | Kasako ....................... 711/162 |
| 2005/0182888 | A1* | 8/2005 | Murotani et al. ............... 711/1 |

* cited by examiner

*Primary Examiner*—Jasmine Song
(74) *Attorney, Agent, or Firm*—Reed Smith LLP; Stanley P. Fisher, Esq.; Juan Carlos A. Marquez, Esq.

(57) ABSTRACT

The storage system of the present invention has a simple configuration and ensures redundancy of the system. The primary storage control device and the first secondary storage control device are connected by a synchronous read method, and the primary storage control device and the second secondary storage control device are connected by an asynchronous read method. The primary storage control device sets a management number in the update data and saves a journal data. The primary storage control device associates the management number with the update data and transmits them to the first secondary storage control device. The first secondary storage control device writes the update data to the first secondary volume, associates the management number with the storage destination address of the update data and stores them in the maintenance table. If the primary storage control device stops, the first secondary storage control device becomes anew a primary storage control device. The first secondary storage control device is connected to the second secondary storage control device by an asynchronous read method.

12 Claims, 20 Drawing Sheets

FIG. 1
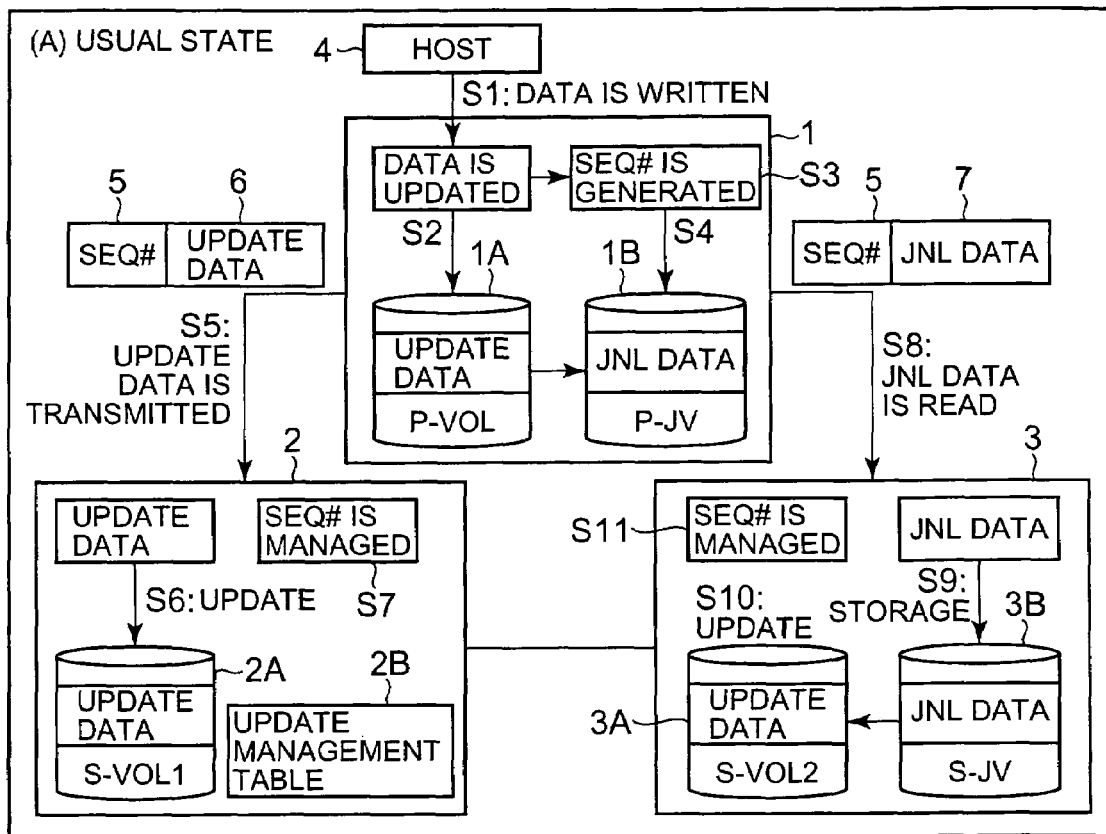
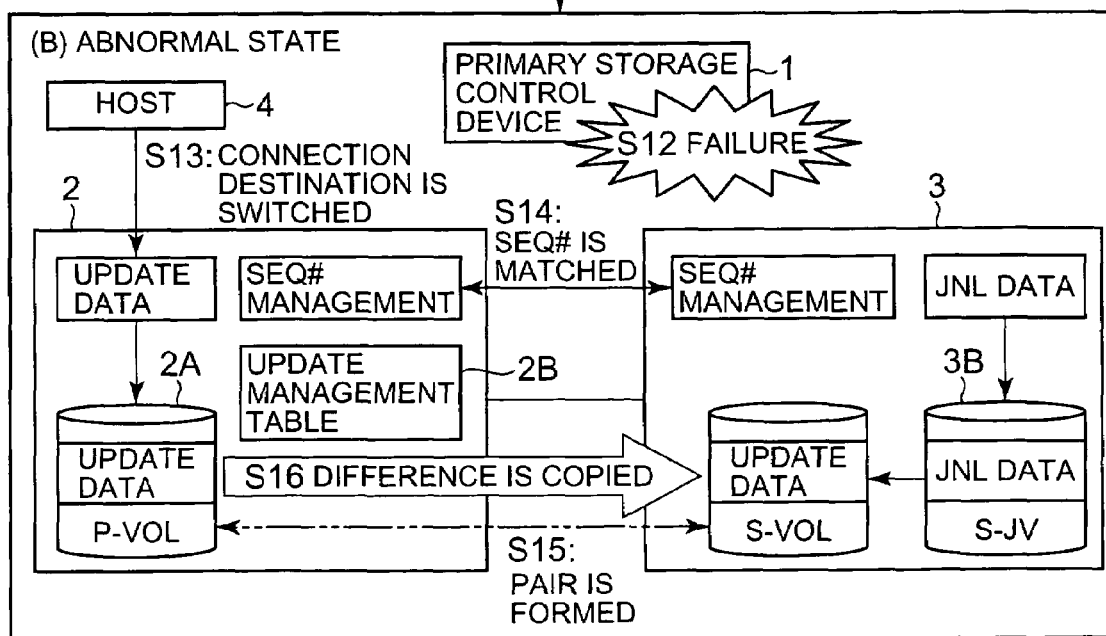

FIG. 9

PAIR MANAGEMENT TABLE (PRIMARY STORAGE CONTROL DEVICE) T21

| P-VOL# | VOLUME ATTRIBUTION | GROUP# | FIRST S-VOL# | FIRST SECONDARY GROUP# | PAIR TYPE | PAIR STATE | SECOND S-VOL# | SECOND SECONDARY GROUP# | PAIR TYPE | PAIR STATE |
|---|---|---|---|---|---|---|---|---|---|---|
| #000 | PRIMARY | #1 | #100 | #1 | SYNCHRONOUS | PAIR | #500 | #3 | ASYNCHRONOUS | PAIR |
| #001 | PRIMARY | #1 | #101 | #1 | SYNCHRONOUS | SUSPEND | #501 | #3 | ASYNCHRONOUS | SUSPEND |
| #002 | NOT USED | — | — | — | — | — | — | — | — | — |
| #003 | PRIMARY | #2 | #103 | #2 | SYNCHRONOUS | PAIR | #502 | #4 | ASYNCHRONOUS | PAIR |

- INFORMATION OF PRIMARY STORAGE CONTROL DEVICE
- INFORMATION OF FIRST SECONDARY STORAGE CONTROL DEVICE
- INFORMATION OF SECOND SECONDARY STORAGE CONTROL DEVICE

FIG. 10

PAIR MANAGEMENT TABLE (FIRST SECONDARY STORAGE CONTROL DEVICE) T22

| FIRST S-VOL# | VOLUME ATTRIBUTION | FIRST SECONDARY GROUP# | P-VOL# | GROUP# | PAIR TYPE | PAIR STATE | SECOND S-VOL# | SECOND SECONDARY GROUP# | PAIR TYPE | PAIR STATE |
|---|---|---|---|---|---|---|---|---|---|---|
| #100 | SECONDARY | #1 | #000 | #1 | SYNCHRONOUS | PAIR | #500 | #3 | ASYNCHRONOUS | PAIR |
| #101 | SECONDARY | #1 | #001 | #1 | SYNCHRONOUS | SUSPEND | #501 | #3 | ASYNCHRONOUS | SUSPEND |
| #102 | NOT USED | — | — | — | — | — | — | — | — | — |
| #103 | SECONDARY | #2 | #003 | #2 | SYNCHRONOUS | PAIR | #502 | #4 | ASYNCHRONOUS | PAIR |

INFORMATION OF FIRST SECONDARY STORAGE CONTROL DEVICE | INFORMATION OF PRIMARY STORAGE CONTROL DEVICE | INFORMATION OF SECOND SECONDARY STORAGE CONTROL DEVICE

FIG. 11

PAIR MANAGEMENT TABLE (SECOND SECONDARY STORAGE CONTROL DEVICE) T23

| SECOND S-VOL# | VOLUME ATTRIBUTION | SECOND SECONDARY GROUP# | FIRST P-VOL# | FIRST SECONDARY GROUP# | PAIR TYPE | PAIR STATE | P-VOL# | GROUP# | PAIR TYPE | PAIR STATE |
|---|---|---|---|---|---|---|---|---|---|---|
| #500 | SECONDARY | #3 | #100 | #1 | SYNCHRONOUS | — | #000 | #1 | ASYNCHRONOUS | PAIR |
| #501 | SECONDARY | #3 | #101 | #1 | SYNCHRONOUS | — | #001 | #1 | ASYNCHRONOUS | SUSPEND |
| #502 | NOT USED | — | — | — | — | — | — | — | — | — |
| #503 | SECONDARY | #4 | #103 | #2 | SYNCHRONOUS | — | #003 | #2 | ASYNCHRONOUS | PAIR |

INFORMATION OF SECOND SECONDARY STORAGE CONTROL DEVICE

INFORMATION OF FIRST SECONDARY STORAGE CONTROL DEVICE

INFORMATION OF PRIMARY STORAGE CONTROL DEVICE

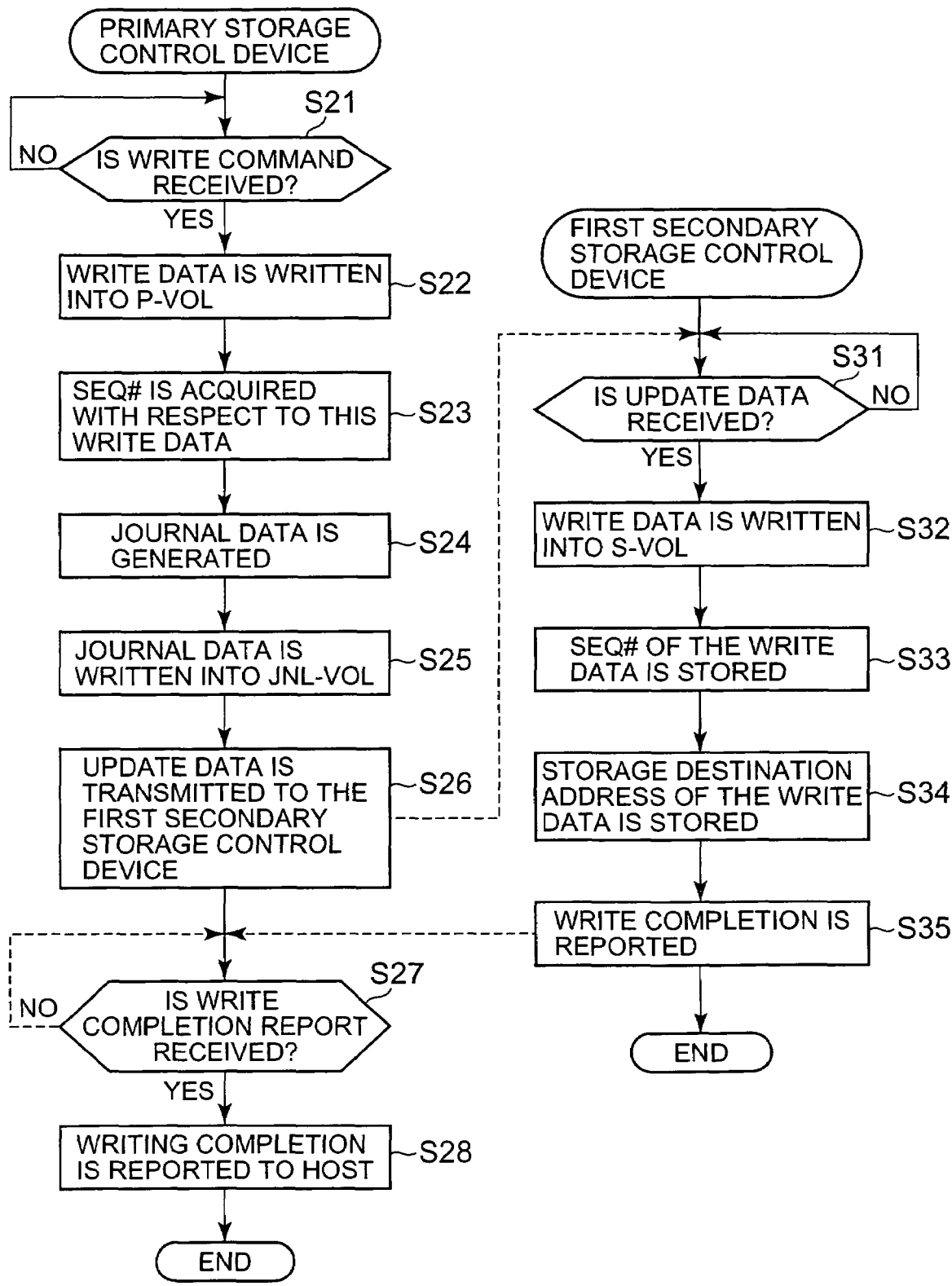

FIG. 18

| | | DATA VOLUME STATE | | | | | | | |
|---|---|---|---|---|---|---|---|---|---|
| | | PRIOR TO START | START | | SUSPENDING | | | | DELETING |
| | | | | | DURING INTER-RUPTION | INTER-RUPTION | DURING TERMI-NATION | TERMI-NATION | DURING INTER-RUPTION | INTER-RUPTION | DURING TERMI-NATION |
| | | SMPLEX | COPY | PAIR | | | | SUSPEND | | | |
| JOURNAL GROUP STATE | PRIOR TO START | | | | | | | | | | |
| | START | | | ◎ | | | | ○ | | | |
| | DURING INTER-RUPTION | | | | | | | | | | |
| | INTER-RUPTION | | | | | | | | | | |
| | DURING TERMI-NATION | | | | | | | | | | |
| | TERMI-NATION | | | | | | | ○ | | | |

STORAGE SYSTEM AND STORAGE MANAGEMENT METHOD

CROSS-REFERENCE TO RELATED APPLICATIONS

This application relates to and claims priority from Japanese Patent Application No. 2005-243568 filed on Aug. 25, 2005, the entire disclosure of which is incorporated herein by reference.

BACKGROUND OF THE INVENTION

1. Field of the Invention

The present invention relates to a storage system and a storage system management method.

2. Description of the Related Art

A storage system, for example, comprises at least one storage control device called a disk array subsystem and provides data storage service to a host computer (referred to hereinbelow as "host"). In a storage control device, a large number of disk drives can be arranged as an array, and a storage area based on RAID (Redundant Array of Independent Disks) can be created.

Furthermore, a backup site can be disposed in a location remote from the main site to cope with a large-area accident, this being known as the so-called disaster recovery system. A storage control device for backup is disposed in the backup site and a data group identical to that of the main site is stored in the this storage control device. As a result, even when the main site stops due to failure, or the like, the data processing service can be continued by the backup site. However, when a failure occurs in the only available backup site before the main site is recovered, the data processing service cannot be provided to the host.

Accordingly, a technology has been suggested with which a plurality of backup sites are provided and the redundancy of the system is ensured even when the main site stops (Japanese Patent Application Laid-open No. 2005-84953). With the conventional technology described in this publication, as indicated in paragraphs No. 0008 to 0010 thereof, a plurality of secondary storage control devices are connected to the primary storage control device. When the storage contents of the primary storage control device is updated, this updated contents is immediately transmitted to one secondary storage control device and reflected in the storage contents of this one secondary storage control device. Furthermore, the storage contents of the primary storage control device is saved as a journal data, and the other secondary storage control device appropriately reads the journal data and reflects it in its own storage contents. The one secondary storage control device produces journal data based on the data update command from the primary storage control device and saves this journal data. When the primary storage control device stops, the other secondary storage control device reads the journal data from the one secondary storage control device and updates its own storage contents.

With the technology described in the aforementioned publication, the redundancy provided by a plurality of storage control devices can be ensured even when the primary storage control device stops. Therefore, the reliability of the storage system increases. However, because one secondary storage control device has to generate the journal data each time data update is conducted, the load on the one secondary storage control device increases. Another problem is that a volume for saving the journal data in the one storage control device has to be provided and the structure becomes complex.

SUMMARY OF THE INVENTION

With the foregoing in view it is an object of the present invention to provide a storage system and a storage system management method that can ensure the redundancy with a plurality of storage control devices and can maintain the consistency of data with a comparatively simple configuration even when one storage control device stops. Other object of the present invention will become apparent from the following description of the preferred embodiments thereof.

In order to attain the above-described object, in the storage system in accordance with one aspect of the present invention, a second storage control device and a third storage control device are connected to a first storage control device. The first storage control device comprises a first data volume, a first journal volume for managing the update history of the first data volume, and a first control unit which sets a management number for write data and generates journal data when an upper-level device writes the write data into the first data volume, stores the journal data in the first journal volume, associates the management number with the write data to be transmitted to the second storage control device. The second storage control device comprises a second data volume related with the first data volume and a second control unit which stores the write data received from the first control unit in the second data volume, associates the management number received from the first control unit with a storage position in the second data volume of the write data to be stored in an update management table. The third storage control device comprises a third data volume related with the first data volume, a second journal volume related with the first journal volume, and a third control unit which reads the journal data from the first journal volume and stores the journal data in the second journal volume and updates the storage contents of the third data volume based on the journal data stored in the second journal volume.

Thus, if the first storage control device receives write data from the upper-level device, it saves the journal data for which a management number was set and transmits the management number and write data to the second storage control device. The management number is a number for managing the order of data update and is generated, for example, as a sequence of numbers increasing by one each time data update is conducted. The second storage control device updates the second data volume synchronously with the update of the first data volume. The third storage control device updates the third data volume by acquiring the journal data stored in the first journal volume at the appropriate timing. Therefore, the contents of the first data volume and second data volume are synchronized and it is possible that a difference in the storage contents occurs between the first data volume or second data volume and the third data volume. The second storage control device stores the update number and write data in the update management table. Therefore, the second storage control device is not required to generate journal data based on the command from the first storage control device and is not required to provide a volume for saving the journal data.

In one implementation mode, when a copy pair is formed by taking the second data volume as a primary volume and the third data volume as a secondary volume, the second control unit notifies the upper-level device to the effect that switching from the first storage control device to the second storage control device has been completed. Thus, the upper-level device is notified about the switching completion before the storage contents of the second data volume and third data volume are matched. As a result, the switching time can be shortened and usability is increased.

In one implementation mode, in the case of switching from the first storage control device to the second storage control device, the second control unit transmits to the third control unit the management number following the newest management number that is held in the third control unit and write data corresponding to the storage control device number. Thus, the second storage control device transmits to the third storage control device the write data and management number only representing the difference between the second data volume and third data volume. As a result, the second data volume and the third data volume can be synchronized within a comparatively short time and usability is increased.

In one implementation mode, the second control unit allows the switching from the first storage control device to the second storage control device when the newest management number held by the third control unit has been registered in the update management table. When the update storage control device table is used cyclically and repeatedly, there is a possibility that the management number stored in the update management table will be overwritten by the new management number before the management number and write data are transmitted to the third storage control device, this possibility depending on the update frequency from the upper-level device. In this case, the third data volume cannot be updated in the correct order. Therefore, switching from the first storage control device to the second storage control device is prohibited and a copy pair of the second data volume and third data volume is not formed.

In one implementation mode, the second control unit copies the entire storage contents of the second data volume into the third data volume when the newest management number has not been registered in the update management table. As a result, a copy pair of the second data volume and third data volume can be formed and the redundancy of the system can be ensured.

In one implementation mode, the first, second and third control units get hold in advance of the correspondence and relationship of the first, second, and third data volume and the correspondence and relationship of the first and second journal volumes. Therefore, in the case of switching from the first storage control device to the second storage control device, the second storage control device can rapidly form a copy pair of the second data volume and third data volume and can shorten the switching time.

In another implementation mode, the second control unit gets hold in advance of the correspondence and relationship of the first data volume and the second data volume, and the third control unit gets hold in advance of the correspondence and relationship of the first data volume and the third data volume and the correspondence and relationship of the first journal volume and the second journal volume. When switching is made from the first storage control device to the second storage control device, the second control unit acquires confirmation information for confirming the correspondence and relationship of the second data volume and the third data volume from the third control unit and forms the copy pair of the second data volume and the third data volume based on the acquired confirmation information. Thus, the second control unit confirms the presence of the third volume that has to be synchronized with the second volume and forms a copy pair based on the confirmation information acquired from the third control unit. As a result, the second control unit and third control unit may hold only the correspondence and relationship with the first storage control device and the storage volume necessary for storing the correspondence and relationship can be reduced.

A storage system management method in accordance with another aspect of the present invention is a method in which a second storage control device and a third storage control device are connected to a first storage control device, the method comprising the steps of setting a management number for write data and generating journal data when an upper-level device wrote the write data to a first data volume of the first storage control device, storing the generated journal data in a first journal volume of the first storage control device, associating the write data and the management number to be transmitted from the first storage control device to the second storage control device, storing write data transmitted from the first storage control device to the second storage control device in the second data volume of the second storage control device, associating a storage position in which the write data is stored in the second data volume and the management number to be registered in an update management table, accessing the first storage control device from the third storage control device when the prescribed timing has arrived and acquiring the journal data stored in the first journal volume, storing the acquired journal data in a second journal volume of the third storage control device, and updating the storage contents of a third data volume of the third storage control device based on the journal data stored in the second journal volume.

In one implementation mode, the method further comprises the steps of monitoring whether or not a failure has occurred in the first storage control device, forming a copy pair of the second data volume as a primary volume and the third data volume as a secondary volume when a failure has occurred in the first storage control device, notifying the upper-level device to the effect that switching from the first storage control device to the second storage control device has been completed when the copy pair is formed, and transmitting a management number following the newest management number held by the third storage control device and write data corresponding to the management number from the second storage control device to the third storage control device in response to a request from the third storage control device.

At least some of means, functions, and steps of the present invention sometimes can be configured as computer programs read and executed by a microcomputer. Such computer programs can be circulated, for example, upon fixing to a storage medium such as a hard disk or an optical disk. Furthermore, the computer program can be provided via a communication network such as internet.

BRIEF DESCRIPTION OF THE DRAWINGS

FIG. 1 is an explanatory drawing illustrating the entire concept of an embodiment of the present invention;

FIG. 9 is an explanatory drawing illustrating a pair management table held in the primary storage control device;

FIG. 10 is an explanatory drawing illustrating a pair management table held in the first secondary storage control device;

FIG. 11 is an explanatory drawing illustrating a pair management table held in a second secondary storage control device;

FIG. 12 is a flowchart illustrating the processing of a write command;

FIG. 18 is an explanatory drawing illustrating a state transition of data volume and journal group during a Resync request;

DESCRIPTION OF THE PREFERRED EMBODIMENTS

Figure 2:
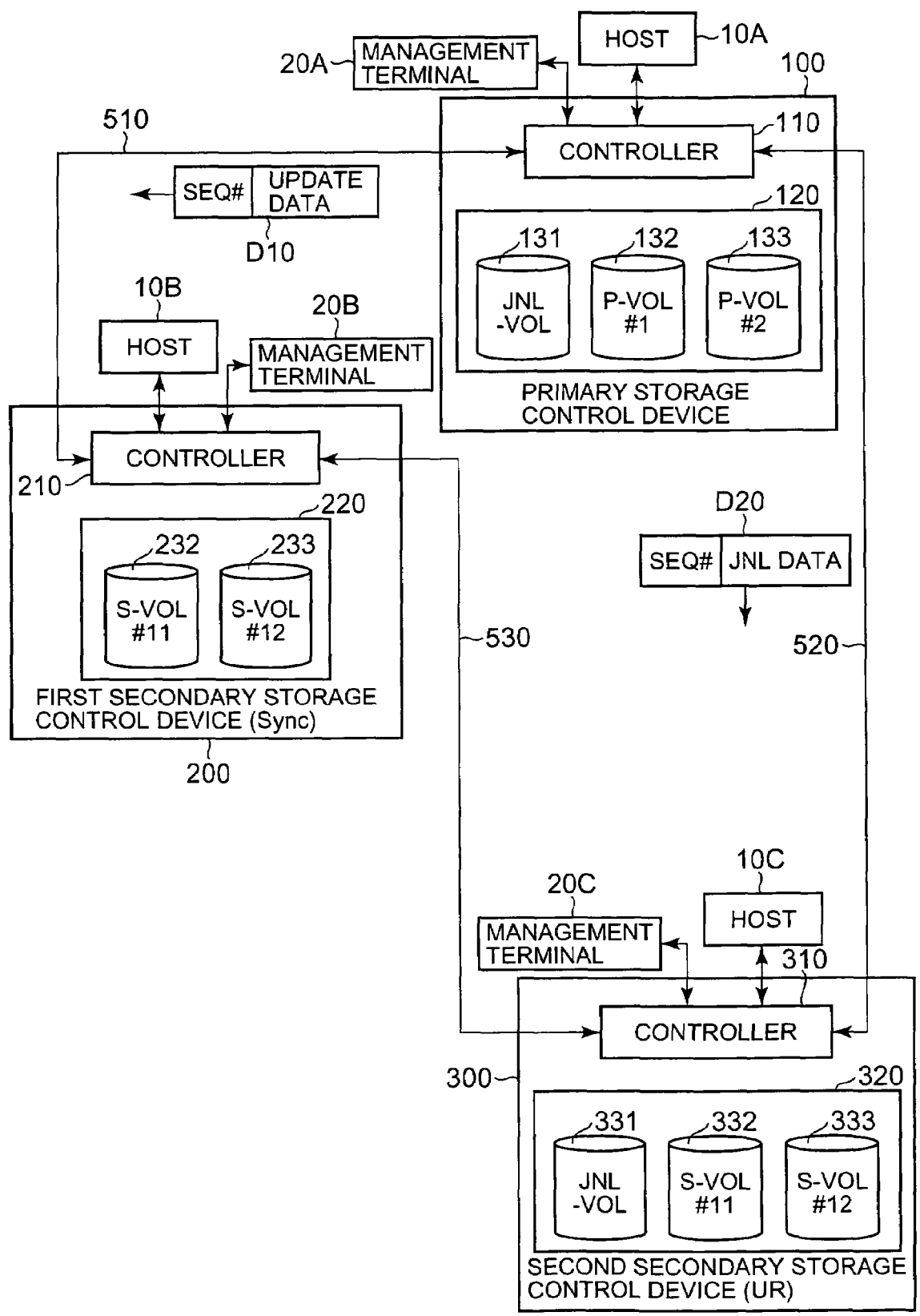
FIG. 2 is an explanatory drawing illustrating the entire configuration of a storage system.

The embodiments of the present invention will be described below with reference to the appended drawings. FIG. 1 is an explanatory drawing illustrating the entire concept of the present embodiment. FIG. 1(*a*) illustrates the state under usual conditions. A storage system can comprise a primary storage control device 1 equivalent to the "first storage control device", a first secondary storage control device 2 equivalent to the "second storage control device", a second secondary storage control device 3 equivalent to the "third storage control device", and a host computer 4 equivalent to the "upper-level device".

The primary storage control device 1 comprises a primary volume (P-VOL) 1A and a primary journal volume (P-JV) 1B. The primary volume 1A equivalent to the "first data volume" stores data to be used by the host 4 and is updated by host 4. The primary journal volume 1B equivalent to the "first journal volume" manages the update history of the primary volume 1A. The journal data stored in the primary journal volume 1B is composed, for example, by associating update data (write data) with a management number (SEQ#).

The first secondary storage control device 2 is communicably connected to the primary storage control device 1 and comprises a first secondary volume (S-VOL) 2A equivalent to the "second data volume" and an update management table 2B. The first secondary volume 2A forms a copy pair with the primary volume 1A and immediately reflects the update contents of the primary volume 1A. The update management table 2B associates the management number with the storage destination address of the update data for management. The first secondary storage control device 2 is disposed, for example, in a location comparatively close to the primary storage control device 1, and the contents of data update to the primary storage control device 1 is immediately transmitted to the first secondary storage control device 2. Thus, data writing between the first secondary storage control device 2 and primary storage control device 1 is carried out by the so-called synchronization method.

The second secondary storage control device 3 is communicably connected to the primary storage control device 1 and comprises a second secondary volume 3A and a secondary journal volume 3B. The second secondary storage control device 3 is provided, for example, in a location at a large distance from the installation location of the primary storage control device 1. The second secondary volume 3A is equivalent to the "third data volume", and the secondary journal volume 3B is equivalent to the "second journal volume". The second secondary storage control device 3 always reads the journal data from the journal volume 1B of the primary storage control device 1 and stores it in the secondary journal volume 3B at the prescribed timing. The second secondary storage control device 3 updates the storage contents of the second secondary volume 3A based on the journal data stored in the secondary journal volume 3B. Therefore, the storage contents of the primary volume 1A and the storage contents of the first secondary volume 2A are actually synchronized in real time, whereas a difference appears between the storage contents of the primary volume 1A and the storage contents of the second secondary volume 3A. The storage contents of the primary volume 1A and the storage contents of the second secondary volume 3A are matched by the second secondary storage control device 3 reading all the journal data from the primary storage control device 1.

The first secondary storage control device 2 and second secondary storage control device 3 are also communicably connected. However, in the usual mode when the primary storage control device 1 operates normally, no special communication is required between the secondary storage control devices 2, 3. For example, a SAN (Storage Area Network) or LAN (Local Area Network) can be used as a communication network connecting the storage control devices 1, 2, 3.

FIG. 1(*b*) illustrates the case where a failure occurred in the primary storage control device 1 and it stopped. The first secondary storage control device 2 replaces the stopped primary storage control device 1 and becomes the primary storage control device. The storage control device 2 that became the primary storage control device conducts data communication with the second secondary storage control device 3 and forms a copy pair of the volume 2A and volume 3A.

The entire operation will be described below. First, as shown in FIG. 1(*a*), the host 4 accesses the primary volume 1A and writes data (S). The primary storage control device 1 writes the update data (write data) received from the host 4 to the primary volume 1A (S2).

The primary storage control device 1 sets the management number (SEQ#) to the update data (S3). This management number is a number for managing the update sequence. Each time the update data is written into the primary volume 1A, the value increases automatically. The primary storage control device 1 generates journal data by associating the management number with the update data, and stores the journal data in the primary journal volume 1B (S4).

Then, the primary storage control device 1 associates the management number 5 used to generate the journal data with the update data 6 and transmits them to the first secondary storage control device 2 (S5). The first secondary storage control device 2 writes the update data to the first secondary volume 2A (S6), associates the storage destination address of the update data with the management number and stores them in the update management table 2B (S7). If the first secondary storage control device 2 writes the update data to the first secondary volume 2A, the write completion is reported to the primary storage control device 1. As a result, the primary storage control device 1 reports to the host 4 the completion of data update to the primary volume 1A.

On the other hand, the second secondary storage control device 3, accesses the primary storage control device 1, for example, within a comparatively short period and reads journal data from the primary journal volume 1B (S8). The second secondary storage control device 3 stores the journal data that was thus read in the secondary journal volume 3B (S9). After confirming the journal data order, the second secondary storage control device 3 reflects the update data in the second secondary volume 3A (S10). The second secondary storage control device 3 manages the management number by the secondary journal volume 3B (S11).

As shown in FIG. 1(*b*), in the case where any failure has occurred and the primary storage control device 1 has stopped (S12), the first secondary storage control device becomes anew a primary storage control device. However, for the sake of convenience, in the explanation below, we will still call it the first secondary storage control device 2. Therefore, the access destination of the host 4 is switched from the primary storage control device 1 to the first secondary storage control device 2 (S13). When the host 4 connected to the primary storage control device 1 and the host 4 connected to the first secondary storage control device 2 differ from each other, the host that will be used can be also switched from the host 4 connected to the primary storage control device 1 to the host 4 connected to the first secondary storage control device 2.

The first secondary storage control device 2 acquires the newest management number of the second secondary storage control device 3 from the second secondary storage control device 3 and checks whether or not the newest management number has been stored in the update management table 2B (S14). In the case where the newest management number held by the second secondary storage control device 3 has been stored in the update management table 2B, the update sequence is maintained and a copy pair is formed by taking the volume 2A of the first secondary storage control device 2 as a primary volume and the volume 3A of the second secondary storage control device 3 as a secondary volume (S15).

By contrast, the case where the newest management number held by the second secondary storage control device 3 has not been stored in the update management table 2B is, for example, the case where the update frequency of the host 4 exceeded the read speed of journal data by the second secondary storage control device 3 and this newest management number has already been overwritten in the newest management table 2B.

In this case, because the previous journal data reflected in the second secondary volume 3A has been lost at least partially, the update sequence cannot be maintained and data matching between the two volumes 2A, 3A cannot be attained based on the journal data. In this case, data can be matched by conducting total copying between the two volumes 2A, 3A.

After the copy pair has been formed, the second secondary storage control device 3 accesses the first secondary storage control device 2 that became the primary storage control device and requests reading of the update data following the newest management number (S16). As a result, the differential data of the volume 2A and volume 3A are transferred from the volume 2A to the volume 3A and the storage contents of the two volumes 2A, 3A soon coincide.

Thus, the configuration of the present implementation mode was such that the primary storage control device 1, first secondary storage control device 2, and secondary storage control device 3 were connected to each other, the storage contents of the primary volume 1A was stored in both the first secondary volume 2A and second secondary volume 3A, and when the primary storage control device 1 stopped, the redundancy of the system was ensured by the first secondary storage control device 2 and second secondary storage control device 3. Therefore, reliability is increased.

Furthermore, in the configuration of the present implementation mode, a common management number 5 was associated with the data transferred from the primary storage control device 1 to both secondary storage control devices 2, 3, and in the first secondary storage control device 2 serving as primary storage control device instead of the primary storage control device 1, the storage destination address of the update data and management number were managed with the update management table. Therefore, it is not necessary for the first secondary storage control device 2 to generate and hold the journal data each time data update is conducted and it is not necessary to prepare the journal volume in advance. As a result, the reliability of the system can be increased with a comparatively simple configuration.

In the configuration of the present implementation mode, the first secondary storage control device 2 serving as the primary storage control device and the second secondary storage control device 3 were connected by an asynchronous read method (also called an UR method). Thus, in this configuration, the occurrence of a temporary difference between the volumes 2A, 3A was allowed and the differential data was managed as a journal data by the storage control device 2 which is a copy source. Therefore, once a copy pair has been formed by the volumes 2A, 3A, switching completion can be reported to the host 4, switching time can be shortened, and usability and reliability can be increased.

Furthermore, in the configuration of the present implementation mode, only the differential data were copied between the volumes 2A, 3A forming a copy pair. Therefore, the storage contents of the volumes 2A, 3A can be matched faster than in the case when the total copying is conducted between the volumes 2A, 3A.

WORKING EXAMPLE 1

FIG. 2 is an explanatory drawing illustrating the entire configuration of the storage system in accordance with the present invention. As for the correspondence and relationship with FIG. 1, a primary storage control device 100 corresponds to the primary storage control device 1 shown in FIG. 1, a first secondary storage control device 200 corresponds to the first secondary storage control device 2 in FIG. 1, a second secondary storage control device 300 corresponds to the second secondary storage control device 3 in FIG. 1, and a host 10A corresponds to the host 4 in FIG. 1.

This storage system can be configured by comprising at least one primary storage control device 100, a plurality of secondary storage control devices 200, 300, hosts 10A, 10B, 10C, and management terminals 20A, 20B, 20C. At least some of the hosts 10A, 10B, 10C, and management terminals 20A, 20B, 20C may be identical. For example, the host 10A and the host 10B may be the same device, and the management terminal 20A and management terminal 20B may be identical devices.

The primary storage control device 100 is a device that provides data input and output service to the host 10A in a usual operation state. The primary storage control device 100 can have a configuration comprising a controller 110 and a storage unit 120, this configuration being described hereinbelow in greater detail. A primary journal volume 131 and a plurality of primary data volumes 132, 133 can be provided in the storage unit 120. The host 10A is, for example, a computer such as a mainframe machine or a server machine and accesses the data volumes 132, 133 and reads and writes data via the controller 110.

The primary storage control device 100 can be connected to secondary storage control devices 200, 300 via respective communication networks 510, 520 such as SAN or internet. The primary storage control device 100 provides to the secondary storage control devices 200, 300 the data updated by the host 10A and the management number set for this data.

Similarly to the primary storage control device 100, the first secondary storage control device 200 can have a configuration comprising a controller 210 and a storage unit 220. For example, a plurality of first secondary data volumes 232, 233 can be provided in the storage unit 220. Those first secondary data volumes 232, 233 are related with the primary data volumes 132, 133, respectively, and the storage contents between the two volumes coincide. The first secondary storage control device 200 is connected to the primary storage control device 100 by the so-called synchronous method, and data update to the primary data volumes 132, 133 is immediately reflected in the first secondary data volumes 232, 233. The host 10B is a host computer for backup.

The first secondary storage control device 200 can be provided, for example, in a location comparatively close to the primary storage control device 100. Decreasing the distance between the primary storage control device 100 and the first secondary storage control device 200 makes it possible to decrease a delay necessary for data exchange between the two storage control devices 100, 200 and to improve the response of the primary storage control device 100.

Similarly to the primary storage control device 100, the second secondary storage control device 300 also can have a configuration comprising a controller 310 and a storage unit 320. The storage unit 320, for example, can be provided with a secondary journal volume 331 and a plurality of second secondary data volumes 332, 333. The second secondary volumes 332, 333 are related with the primary data volumes 132, 133, respectively. The primary data volumes 132, 133 and second secondary volumes 332, 333 are connected by a method allowing the storage contents of the two groups to be mismatched. In the present specification, this method is sometimes called an asynchronous read method (UR method). With the asynchronous read method, the journal data held in the primary storage control device 100 are read by the second secondary storage control device 300 periodically or non periodically and are reflected in its own volumes 332, 333. The second secondary storage control device 300 is connected to the first secondary storage control device 200 via a communication network 530 such as a SAN or internet. The host 10C is a host computer for backup.

The management terminals 20A, 20B, 20C are computer devices for managing the configuration of storage control devices 100, 200, 300 connected respectively thereto or for acquiring the internal information of each storage control device 100, 200, 300. Furthermore, as described hereinbelow, instructions of various kinds can be provided to each storage control device 100, 200, 300 by a storage management program 12 provided in the hosts 10A, 10B, 10C. Therefore, the management terminals 20A, 20B, 20C are not always required.

Each time the host 10A updates the primary data volumes 132, 133, update information D10 is transmitted from the primary storage control device 100 to the first secondary storage control device 200. This update information D10 can comprise a management number (SEQ#) and update data (write data).

On the other hand, each time the host 10A updates the primary data volumes 132, 133, separate update information D20 is generated and stored in the primary journal volume 131. This update information D20 also can comprise a management number and update data. The update information D20 can be also called journal data. The second secondary storage control device 300 accesses the primary storage control device 100, reads the update information D20, that is, journal data D20, and stored it in the secondary journal volume 331.

Figure 3:
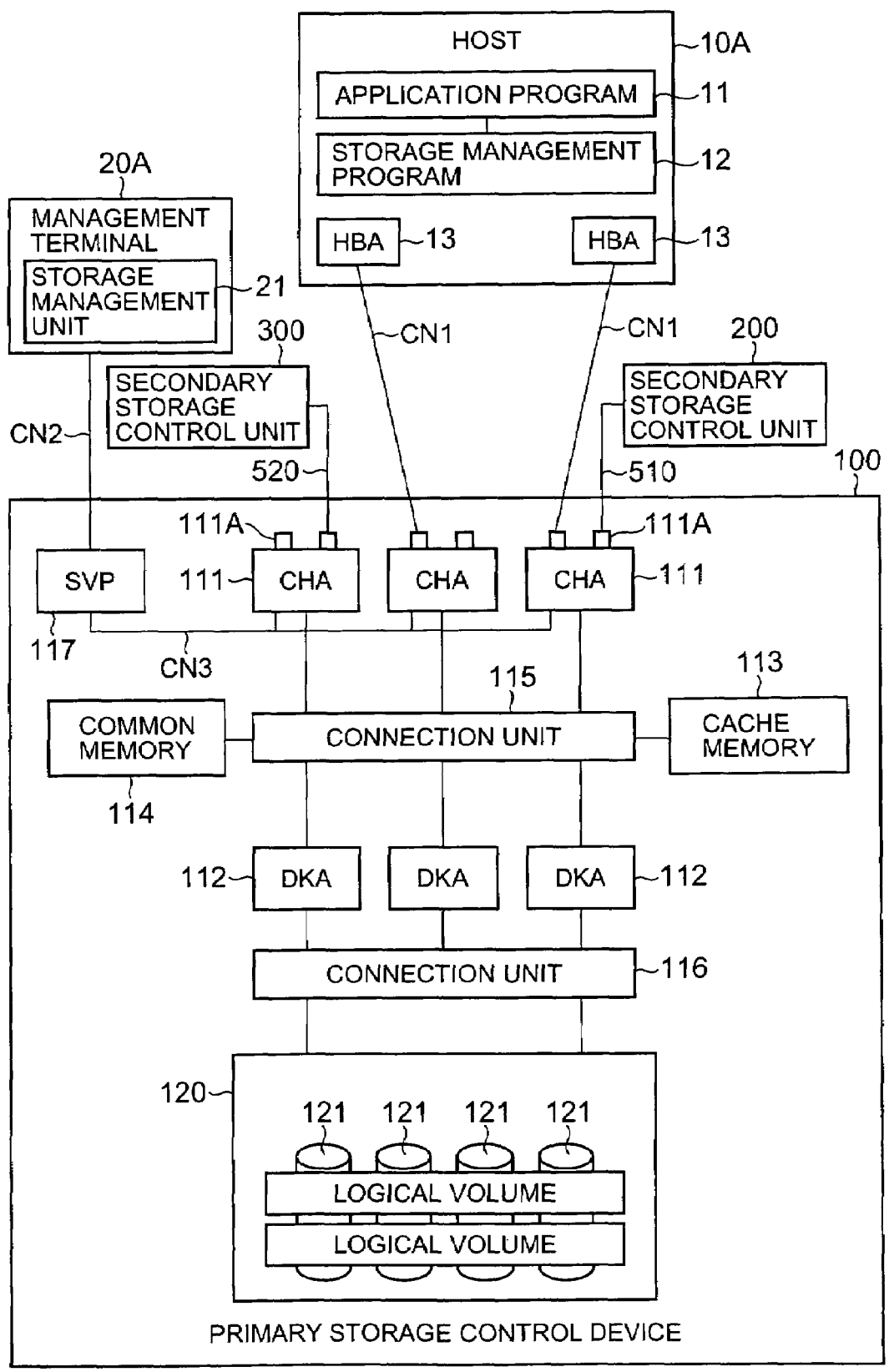
FIG. 3 is an explanatory drawing illustrating the primary site configuration.

FIG. 3 is a block diagram illustrating the hardware configuration of the storage system. This figure shows the configuration of the primary site where the primary storage control device 100 is provided, but a first secondary site where the first secondary storage control device 200 is provided and a second secondary site where the second secondary storage control device 300 is provided also can have a similar configuration.

The host 10A is a computer device comprising a microprocessor and a memory. For example, the host can have a configuration comprising an application program 11, a storage management program 12, and a HBA (Host Bus Adapter) 13.

The application program 11 is a program for providing data processing service to a client terminal (not shown in the figure), for example, a customer management program, a sales management program, or an electronic mail management program. The storage maintenance program 12 is a program for providing various commands to the primary storage control device 100 (and secondary storage control devices 200, 300). The HBA 13 is an interface control unit for conducting data communication with the primary storage control device 100 (and secondary storage control devices 200, 300). Each HBA 13 is connected to a respective port 111A of the primary storage control device 100 via a network CN1 such as SAN.

A plurality of application programs 11 and HBA 13 can be provided and each of them can be operated independently. Furthermore, providing a plurality of HBA 13 makes it possible to access the primary storage control device 100 when a failure occurs in any one communication path via another communication path.

The maintenance terminal 20A is a computer device comprising a microprocessor and a memory and has a storage maintenance unit 21 provided therein. The storage maintenance unit 21 indicates configuration changes of the primary storage control device 100 or reads various states of the primary storage control device 100 and displays them on the terminal screen.

The primary storage control device 100, for example, can have a configuration comprising at least one channel adaptor 111, at least one disk adaptor 112, at least one cache memory 113, at least one common memory 114, connection units 115, 116, a service processor 117, and a storage unit 120. The controller 110 shown in FIG. 2 can be composed of the channel adaptor 111, disk adaptor 112, and memories 113, 114.

The channel adaptor (abbreviated hereinbelow as CHA) 111 is an upper-level communication control unit for conducting data exchange with the host 10A and can have a configuration, for example, comprising a microprocessor or a local memory and a data transfer circuit. The CHA 111 comprises at least one communication port 11A. Any one communication port 111A or a plurality thereof are connected to the HBA 13 of the host 10A via a network CN1. Furthermore, other multiple communication ports 111A are connected to secondary storage control devices 200, 300 via networks 510, 520.

The disk adaptor (abbreviated hereinbelow as DKA) 112 is a lower-level communication control unit for conducting data exchange with the storage unit 120 and can have a configuration, for example, comprising a microprocessor or a local memory and a data transfer circuit. The DKA 112 can be also configured as a control board separate from the CHA 111, or the functions of the CHA 111 and the functions of the DKA 112 can be consolidated on the same control board.

The cache memory 113 is, for example, a memory for storing user's data used by the host 10A or information for temporary management. The common memory 114 is, for example, a memory for storing control information of various kinds for controlling the primary storage control device 100. Part of the control information can be copied to local memory of CHA 111 or DKA 112. The cache memory 113 and common memory 114 may be configured as separate memory boards or the cache memory 113 and common memory 114 may be consolidated on the same memory board.

The connection unit 115 serves to connect each CHA 111, each DKA 112, cache memory 113, and common memory 114 to each other. The connection unit 115 comprises, for example, a bus or a crossbar switch. The connection unit 116 serves to connect each DKA 112 and the display driver 121.

The service processor (referred to hereinbelow as SVP) 117 monitors each state of the primary storage control device 100 and rewrites the control information correspondingly to the instruction from the management terminal 20A. The SVP 117 is connected to each CHA 111, for example, via an internal network CN3. The SVP 117 also can obtain information on DKA 112 or common memory 114 via any one CHA 111. Furthermore, a configuration may be also used in which the SVP 117 is connected to each CHA 111 and each DKA 112 with the internal network CN 3.

The storage unit 120 comprises a plurality of disk drives 121. For example, a hard disk drive, a semiconductor memory drive, a holographic memory drive, an optical disk drive, a magnetooptical disk drive, and a magnetic tape drive can be used as the disk drive 121. Virtualization of the physical storage area of the disk drive 121 makes it possible to generate at least one logical storage area. This logical storage area is called a logical volume. The host 10A assesses the logical volume as an access object. The above-described volumes 131, 132, 133 are respective logical volumes.

First, the operation of the primary storage control device 100 will be explained in a simple manner. When the host 10A issues a read command, the CHA 11 verifies whether or not the data requested from the host 10A exist in the cache memory 113. When the data has been stored in the cache memory 113, the CHA 111 reads the data from the cache memory 113 and transmits it to the host 10A. By contrast, when the data requested from the host 10A does not exist on the cache memory 113, the CHA 111 requests the DKA 112 to read the data. The instruction from the CHA 111 to the DKA 112 is conveyed via the common memory 114. If the DKA 112, which constantly refers to the common memory 114, discovers an instruction from the CHA 111, it reads the data from the disk drive 121 and stores it in the cache memory 113. This operation is called a staging processing. The CHA 111 is notified about completion of the staging processing via the common memory 114. During staging, the DKA 112 converts a physical address into a logical address (LBA: Logical Block Address).

When the host 10A issues a write command, the CHA 111 verifies empty capacity of the cache memory 113 and receives the write data from the host 10A if the reception of write data is possible. The CHA 111 stores the received write data in the cache memory 113. Furthermore, the CHA 111 instructs the DKA 112 to write this data to the logical volume. This instruction is conveyed via the common memory 114. Transmitting various instructions and reports via the common memory 114 makes it possible to operate a plurality of CHA 111 and DKA 112 independently from each other and in parallel with a comparatively simple structure.

If the DKA 112 discovers the write command via the common memory 114, the write data that has been stored in the cache memory 113 is written into a logical volume. More specifically, the DKA 112 converts the logical address of the write data into a physical address and stores the write data in a prescribed location of the disk drive 121 constituting the logical volume that was requested to be written. When this logical volume has a RAID configuration, the write data is written by distributing between a plurality of disk drivers 121. Data transfer from the cache memory 113 to the disk drive 121 is called a destage processing. The CHA 111 is notified about completion of the destage processing via the common memory 114. The destage processing can be conducted at an appropriate timing based on the empty capacity of the cache memory 113 or processing load of the primary storage control device 100. It is not necessary to conduct the destage processing immediately after the reception of write command.

The CHA 111 associates a management number with the write command from the host 10A and write data and transfers them to the first secondary storage control device 200. Then, if a report on write completion is received from the first secondary storage control device 200, the CHA 111 reports completion of the write command processing to the host 10A. Therefore, the host 10A is notified about completion of write command processing when write data are held in both the primary storage control device 100 and the first secondary storage control device 200.

Furthermore, the CHA 111 associates a management number with the write command and write data, generates a journal data, and stores this journal data in the primary journal volume 131. This journal data is transferred from the primary storage control device 100 to the second secondary storage control device 300 based on a read request from the second secondary storage control device 300.

Figure 4:
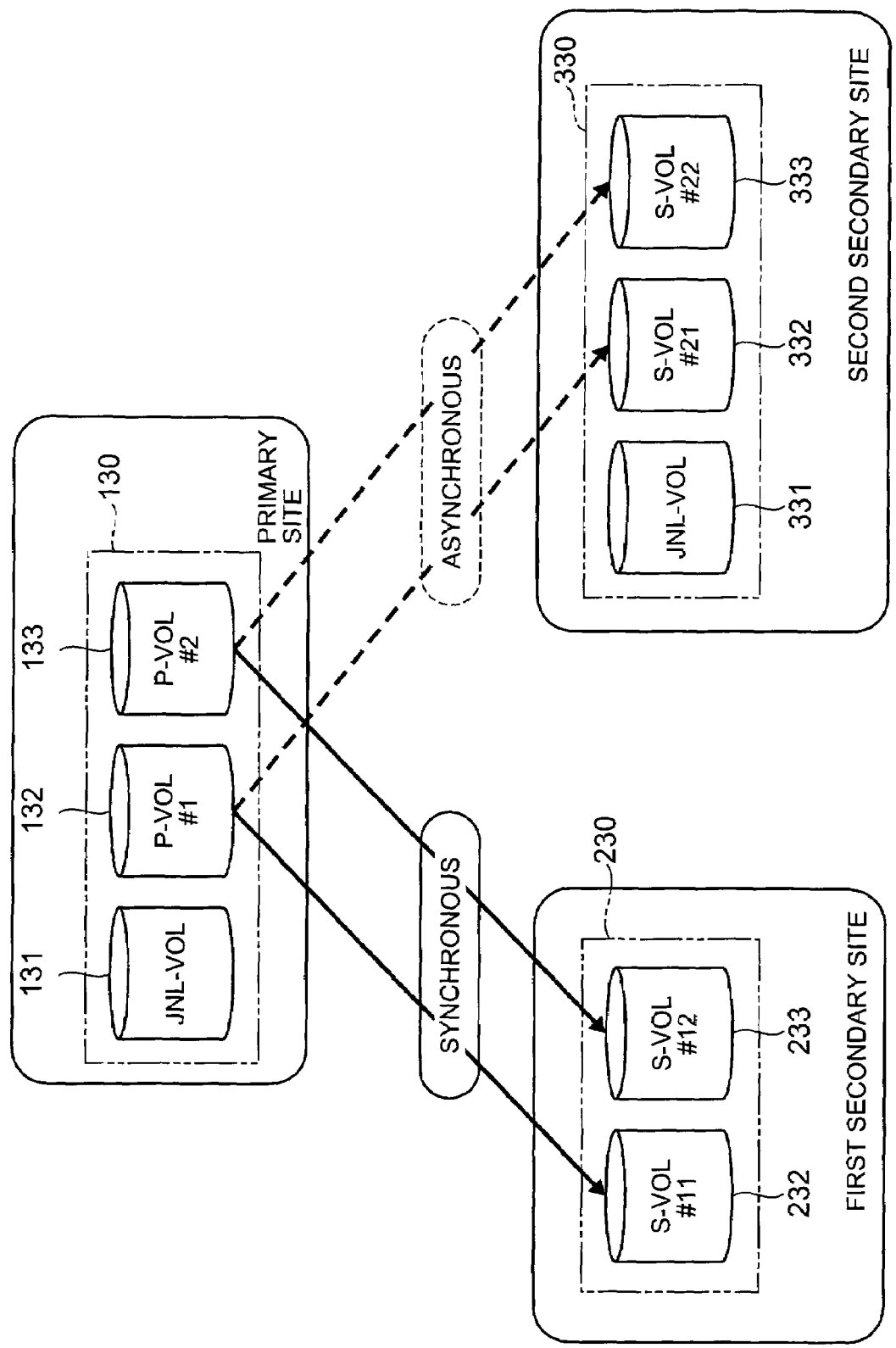
FIG. 4 is an explanatory drawing illustrating the correspondence and relationship between volumes of each site.

FIG. 4 is an explanatory drawing illustrating schematically the relationship between the volumes. The volumes 131, 132, 133 of the primary site, that is, the primary storage control device 100, belong to the same journal group 130. The journal group 130 is a group in which journal data are managed commonly. When data updates of data volumes 132, 133 has not been matched, those data volumes 132, 133 belong to the same journal group 130. The history of data update for each data volume 132, 133 is managed by the primary journal volume 131.

Similarly, in the first secondary site, a journal group 230 is provided, and each first secondary data volume 232, 233 belongs to this journal group 230. The first secondary data volumes 232, 233 are associated with the primary data volumes 132, 133, and the storage contents of each first secondary data volume 232, 233 coincides with the storage contents of primary data volumes 132, 133 almost in a real time mode. This journal group 230 is sometimes also called a first secondary journal group.

In the second secondary site, too, a journal group 330 is provided. A secondary journal volume 331 and second secondary data volumes 332, 333 are provided in the journal group 330. Each second secondary data volume 332, 333 is related with the primary data volumes 132, 133, and though a difference in time appears therebetween, the storage contents of the second secondary data volume 332, 333 coincide with the storage contents of the primary data volumes 132, 133. The history of data update of the second secondary data volume 332, 333 is managed by the secondary journal volume 331.

Figure 5:
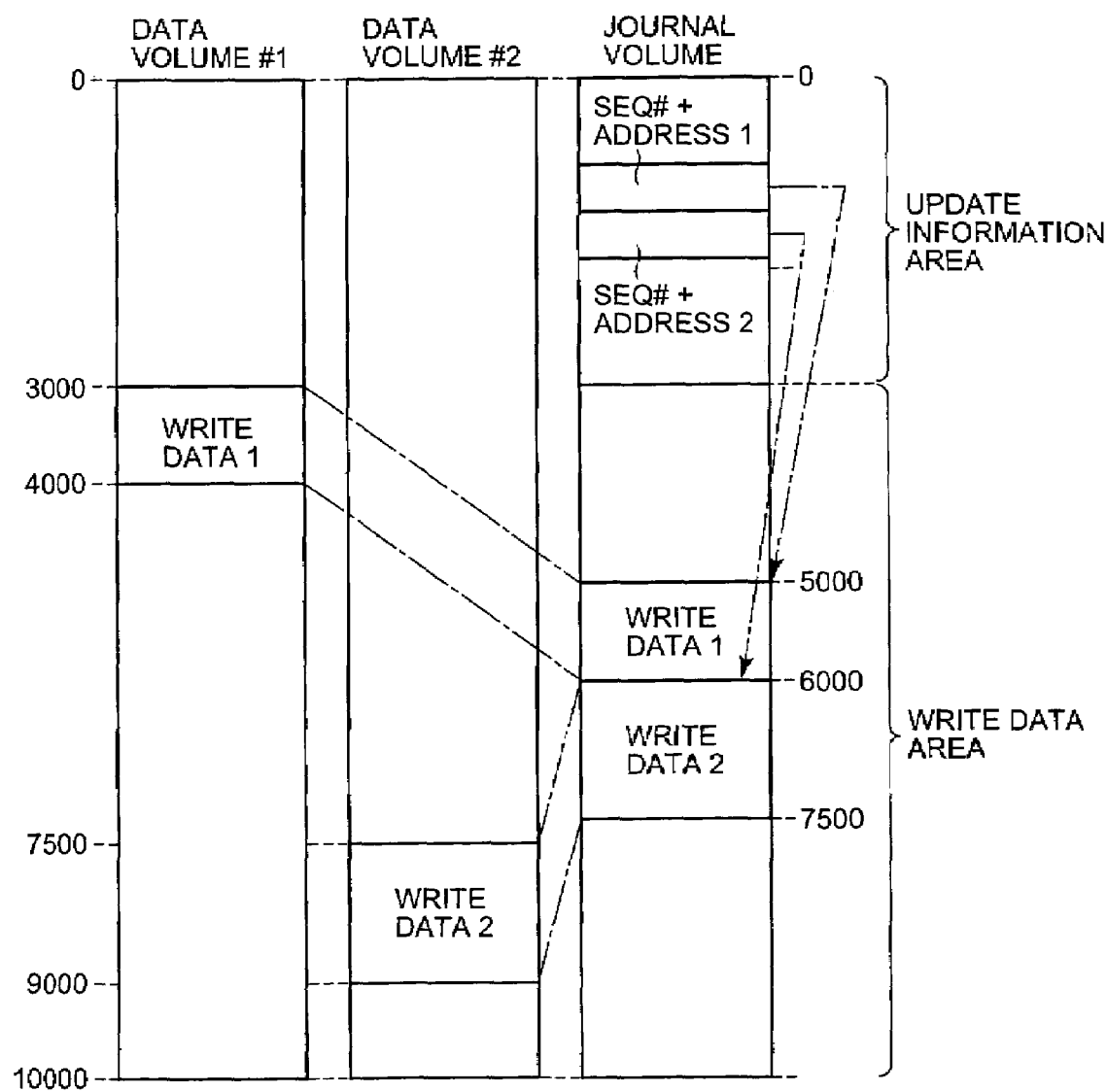
FIG. 5 is an explanatory drawing illustrating the relationship between a data volume and a journal volume.

FIG. 5 is an explanatory drawing illustrating the relationship between the journal volume and data volume. The journal volume manages data updates to each data volume existing in the journal group. An update information area is provided at the head side of storage area of the journal volume, and a write data area is provided in the storage area following this update information area.

A copy of write data written in each data volume is stored in the write data area. The storage destination address of write data stored in the write data area and a management number are associated and stored in the update information area. Information composed of this management number and storage destination address in the journal volume is sometimes called update management information. The management number is a number issued for each data update and serves to manage the update sequence.

The update information area and write data area are used repeatedly. Thus, when the update information area is used till the end address, a return is made to the head address and new update management information (management number and storage destination address) is overwritten and stored. Similarly, when the write data area is used to the end address, a return is made to the head address of the write data area and new write data is overwritten and stored.

Figure 6:
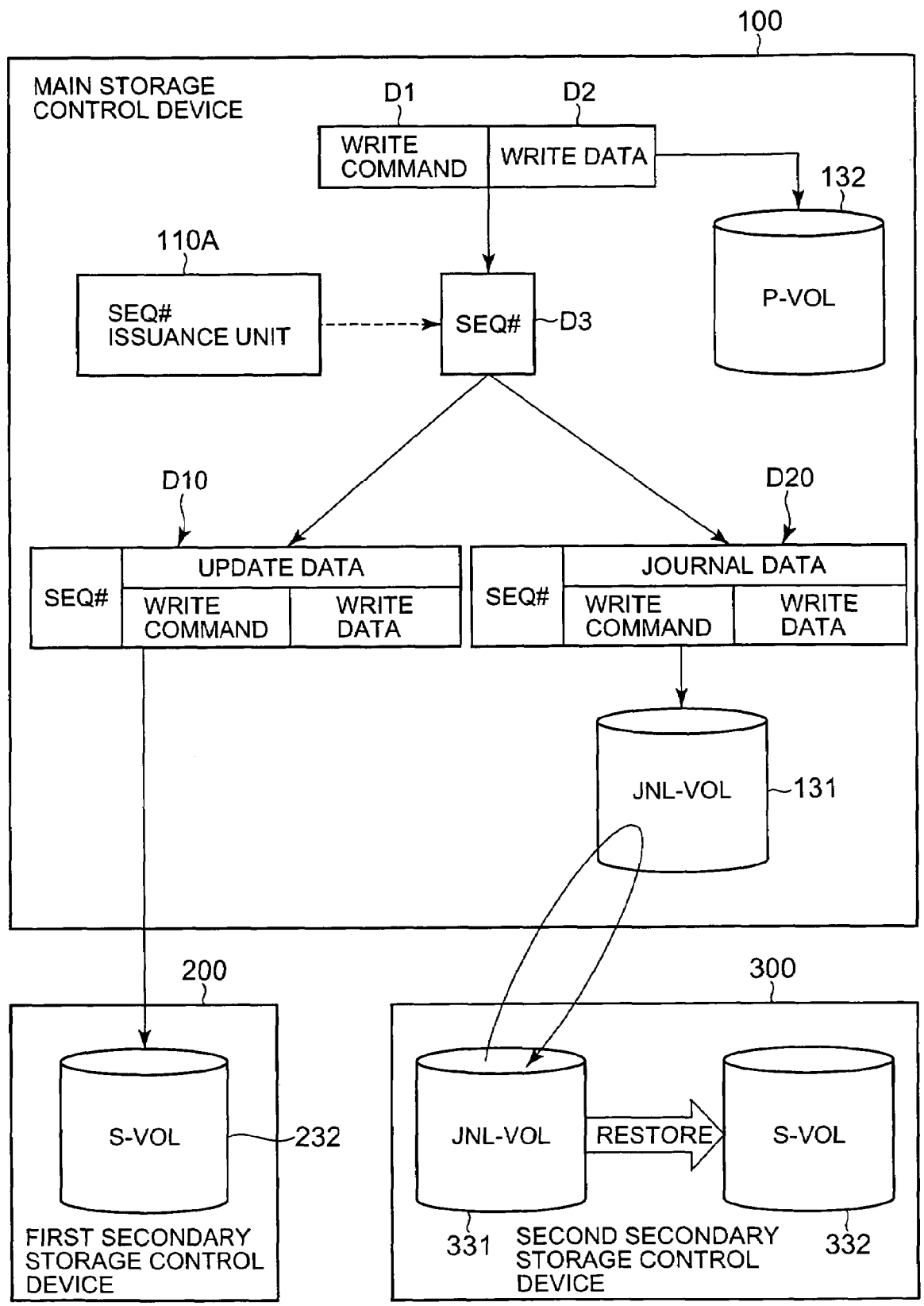
FIG. 6 is an explanatory drawing illustrating the structure of information supplied to each secondary storage control device by data update from a host.

FIG. 6 is an explanatory drawing illustrating schematically how data of each secondary data volume is updated following data update to the primary data volume. For the sake of convenience, the explanation will be conducted with respect to a primary data volume 132 as an example.

If the primary storage control device 100 receives a write command D1 and write data D2 from the host 10A, the write data is written in the primary data volume 132. At the same time, the management number issuance unit 110A of the primary storage control device 100 generates a management number D3 for managing this data update. The management number D3 is generated, for example, so that the value thereof increases by one with each update. The management number issuance unit 110A is a counter comprising software or hardware.

The primary storage control device 100 generates journal data D20 with the management number D3, write command D1, and write data D2. The journal data D20 is stored in the primary journal volume 131. Furthermore, the primary storage control device 100 generates update data D10 with the management number D3, write command D1, and write data D2. This update data D10 is transmitted to the first secondary storage control device 200. The update data D10 and journal data D20 are configured to comprise common information, but timings of supply to each secondary storage control device 200, 300 are different.

If the first secondary storage control device 200 receives the update data D10, it writes the write data D2 into the first secondary data volume 232. Furthermore, the first secondary storage control device 200 associates the storage destination address of the write data D2 and management number D3 and stores them in the update information management table T10. The update information management table T10 will be described below with reference to FIG. 8.

On the other hand, the second secondary storage control device 300 reads the journal data D20 from the primary journal volume 131 with a comparatively short period and stores the journal data D20 that was read out in the secondary journal volume 331. The second secondary storage control device 300 verifies that the journal data have been orderly arranged based on the management numbers D3 and reflects the contents of data update indicated by the journal data D20 in the second secondary data volume 332. This reflection processing is also called a restore processing.

Figure 7:
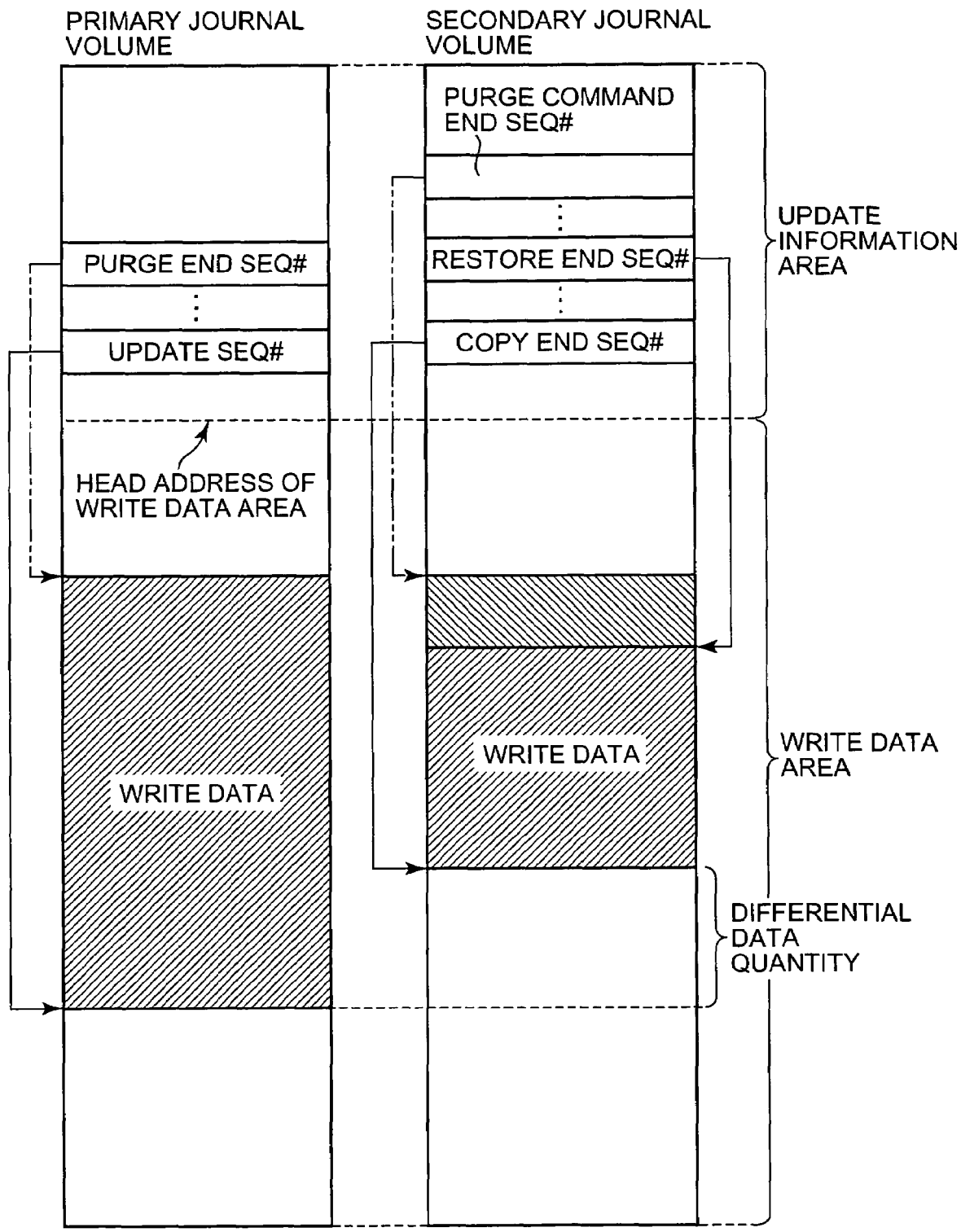
FIG. 7 is an explanatory drawing illustrating the relationship between a primary journal volume and a secondary journal volume.

FIG. 7 is an explanatory drawing illustrating schematically the relationship between the primary journal volume 131 and secondary journal volume 331. As described hereinabove, each journal volume 131, 331 comprises an update information area and write data area.

A plurality of components update management information (management number+storage destination address) can be stored in the update information area of the primary journal volume 131. Of those update management information components, the update management information positioned at the very head of the update information area is the oldest management number stored in the journal volume 131 and is set in the journal data next to the journal data that was deleted from the journal volume 131. The management number contained by the update management information that was last stored in the update information area is the newest management number stored in the journal volume 131 and is set in the data update that was conducted most recently.

A plurality of update management information components can be also stored in the update information area of the secondary journal volume 331. The management number contained in the update management information stored at the very head of the update information area indicates the purged management number. The purged management number is a number next to the management number that was set in the very last journal data that was instructed to be deleted in the primary storage control device 100. The restored management number is a number indicating the very last journal data reflected in the second secondary data volume 332. The copied maintenance number is a number indicating the end of journal data copied from the primary journal volume 131 into the secondary journal volume 331.

A difference appears between the journal data stored in the primary journal volume 131 and the journal data stored in the secondary journal volume 331. This difference is eliminated as time elapses. The data stored in the secondary journal volume 331 is reflected at the appropriate timing in the second secondary data volume 332. In response to this reflection, the restored maintenance number is moved back. The restored journal data are not required to be held. The second secondary storage control device 300 points out the maintenance number of the end of unnecessary journal data to the primary storage control device 100 and instructs to delete them.

Figure 8:
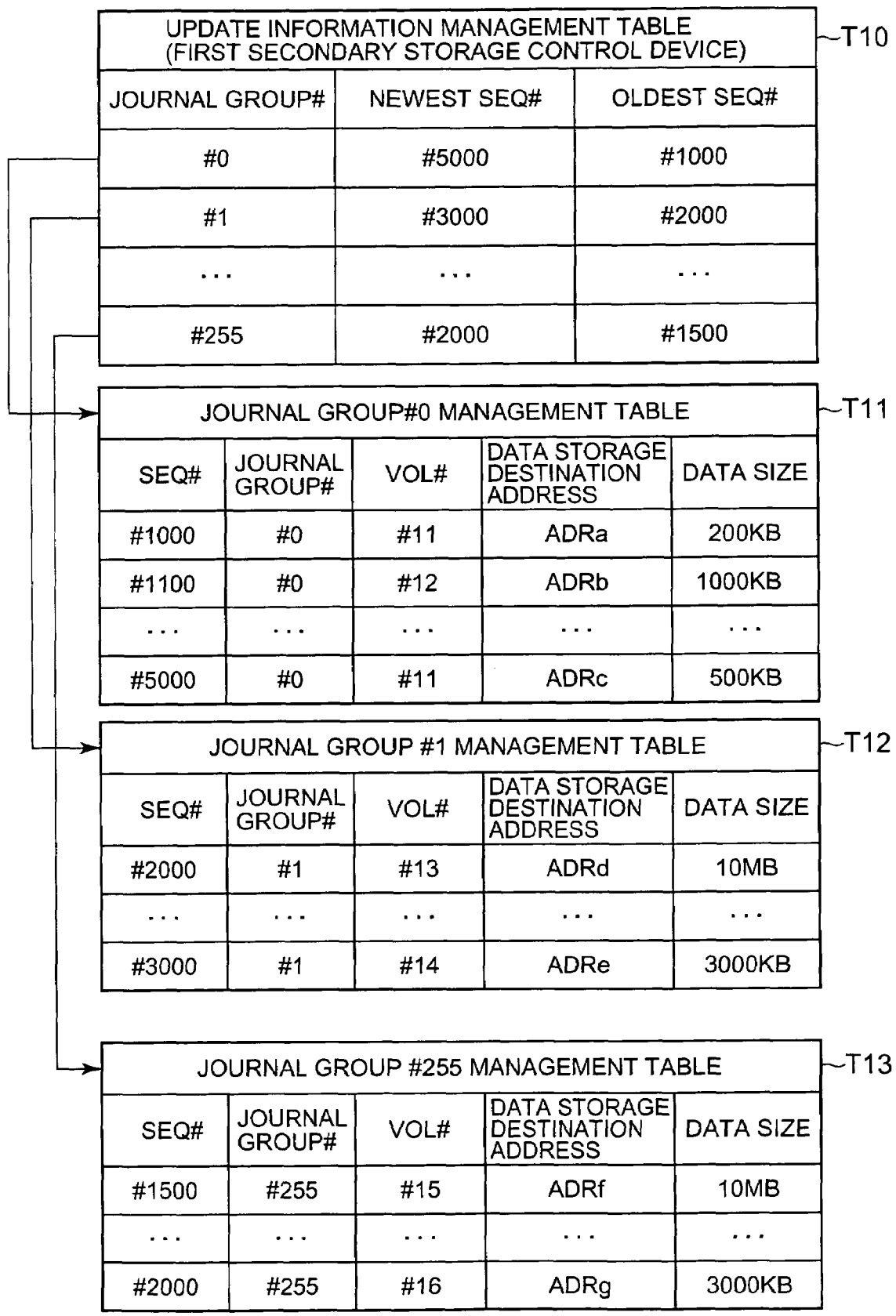
FIG. 8 is an explanatory drawing illustrating the structure of a management table used for managing the data update history in a first secondary storage control device.

FIG. 8 is an explanatory drawing illustrating the configuration of the update information maintenance table T10 used by the first secondary storage control device 200. The update information maintenance table T10 can be stored, for example, in the common memory of the first secondary storage control device 200. The update information maintenance table T10 can be composed, for example, by associating a journal group number for specifying the journal group, the newest maintenance number in this journal group, and the oldest maintenance number in the journal groups.

Furthermore, respective maintenance tables T11 to T13 are provided for each journal group, and those maintenance tables T11 to T13 are related with the update information maintenance table T10 via the journal group number. Each maintenance table T11 to T13 can be configured by associating, for example, a maintenance number, a journal group number, a volume number specifying the first secondary data volume, a storage destination address of the write data stored in the first secondary data volume, and the data size of the write data. The storage contents of maintenance tables T11 to T13 for each journal group can be also contained in the update information maintenance table T10.

With the update information maintenance table T10 that is thus configured, the history of data updating to the first secondary data volumes 232, 233 can be managed without using the journal volume.

FIG. 9 is an explanatory drawing illustrating a pair management table used by the primary storage control device 100. The pair management table T21 can be stored, for example, in the common memory 114 of the primary storage control device 100. Similarly to the below-described other pair management tables T22, T23, the pair management table T21 serves to manage the correspondence and relation of the primary data volumes 132, 133, first secondary data volumes 232, 233, and second secondary data volume.

The pair management table T21 is configured to comprise information relating to a primary data volume, information relating to a first secondary data volume corresponding to this primary data volume, and information relating to a second secondary data volume corresponding to this primary data volume.

Information relating to the primary data volume, for example, comprises a volume number (P-VOL#) for identifying the primary data volume, attribution of the primary data volume, and the number of the number of the journal group to which primary data volume belong.

Information relating to the first secondary data volume corresponding to the primary data volume, for example, comprises a volume number (first S-VOL#) for specifying the first secondary data volume associated with the primary data volume, a first secondary journal group number for specifying the journal group to which this first secondary data volume belongs, information for indicating a pair class of the first secondary data volume and this primary data volume, and information indicating a pair state of the first secondary data volume and the primary data volume.

Similarly, information relating to the second secondary data volume corresponding to the primary data volume, for example, comprises a volume number (second S-VOL#) for specifying the second secondary data volume associated with the primary data volume, a second secondary journal group number for specifying the journal group to which this second secondary data volume belongs, information for indicating a pair class of the second secondary data volume and this primary data volume, and information indicating a pair state of the second secondary data volume and the primary data volume.

Here, the volume attribution can be, for example, "primary" and "not used". A volume for which the "primary" attribution was set is used as a primary data volume. A volume for which the "not used" attribution was set is provided as a volume, but is not used as a primary data volume. Other attributions can be also employed.

Examples of pair classes include "synchronous" and "asynchronous". "Synchronous" indicates, as described hereinabove, that data update to the primary data volume and data update to the secondary data volume are conducted synchronously. "Asynchronous" indicates that the data update period to the primary data volume and data update period to the secondary data volume are not synchronous. In the case of "asynchronous" class, journal data is read from the secondary storage control device side to the primary storage control device 100, and data update (restore) to the secondary data volume is carried-out based on the journal data that were read out.

Examples of pair states include "pair", "suspend", and "simplex". "Pair" indicates a state in which two volumes formed a copy pair and the storage contents of the copy source volume (primary data volume) is reflected in the copy destination volume (secondary data volume). "Suspend" indicates a state in which the copy pair has been canceled and data update generated in the copy source volume is differentially managed in the copy source. "Simplex" indicates a usual volume that does not participate in a copy pair.

FIG. 10 is an explanatory drawing illustrating a pair management table T22 used in the first secondary storage control device 200. The pair management table T22 can be stored, for example, in the common memory of the first secondary storage control device 200. The pair management table T22, similarly to the pair management table T21, manages the correspondence and relationship of the first secondary data volumes 232, 233, primary data volumes 132, 133, and second secondary data volumes 332, 333.

The pair management table T22 is configured to comprise information relating to a first secondary data volume, information relating to a primary data volume corresponding to this first secondary data volume, and information relating to a second secondary data volume corresponding to this primary data volume.

FIG. 11 is an explanatory drawing illustrating a pair management table T23 used in the second secondary storage control device 300. The pair management table T23 can be stored, for example, in the common memory of the second secondary storage control device 300. The pair management table T23, similarly to the pair management tables T21, T22, manages the correspondence and relationship of the second secondary data volumes 332, 333, primary data volumes 132, 133, and first secondary data volumes 232, 233.

The pair management table T23 is configured to comprise information relating to a second secondary data volume, information relating to a primary data volume corresponding to this second secondary data volume, and information relating to a first secondary data volume corresponding to this primary data volume.

FIG. 12 is a flowchart illustrating schematically the processing conducted when the primary storage control device 100 receives a write command. This flowchart illustrates the processing schematically to a degree sufficient for a person skilled in the art to implement the present invention and is different from a real program; the same is true for all the below-described flowcharts.

The primary storage control device 100 monitors whether or not a write command has been received from the host 10A (S21). If the write command has been received (S21: YES), the primary storage control device 100 writes the write data received from the host 10A to the designated address of the designated primary data volume (S22).

Furthermore, the primary storage control device 100 acquires anew the maintenance number for this write data (S23) and generates journal data (S24). The primary storage control device 100 stores the generated journal data in the primary journal volume 131 (S25). As described hereinabove, the journal data are stored in the journal volume in the order of generation.

The primary storage control device 100 associates the maintenance number used for generating the journal data with the write data and transmits them to the first secondary storage control device 200 (S26). Thus, the contents of data update transmitted to the first secondary storage control device 200 via a common maintenance number is related with the contents of data update acquired by the second secondary storage control device 300.

Then, the primary storage control device 100 waits for a write completion report from the first secondary storage control device 200 (S27). If the primary storage control device 100 receives the write completion report for write data from the first secondary storage control device 200 (S27: YES), it reports to the host 10A that the processing of the write command has been completed (S28).

Let us focus attention on the operation of the first secondary storage control device 200. If the first secondary storage control device 200 receives the write data associated with the maintenance number from the primary storage control device 100 (S31: YES), it writes the received write data to the prescribed location of the corresponding first secondary data volume (S32). The prescribed location is an address where the write data has to be written and is clearly indicated by a write command.

The first secondary storage control device 200 registers a maintenance number related with this write data in the update information maintenance table T10 (S33). Furthermore, the first secondary storage control device 200 registers the address written in the first secondary data volume in the update information management table T10 (S34). More specifically, as described hereinabove, the management tables T11 to T13 are prepared for each journal group, and the maintenance number and storage destination address of the write data are written in the maintenance table of the corresponding journal group. The newest maintenance number in the update information management table T10 is then updated. The explanation hereinbelow is conducted with respect to the update information management table T10, but this also includes maintenance tables T11 to T13 for each journal group.

The first secondary storage control device 200 then notifies the primary storage control device 100 of storing the write data in the first secondary data volume (S35).

Figure 13:
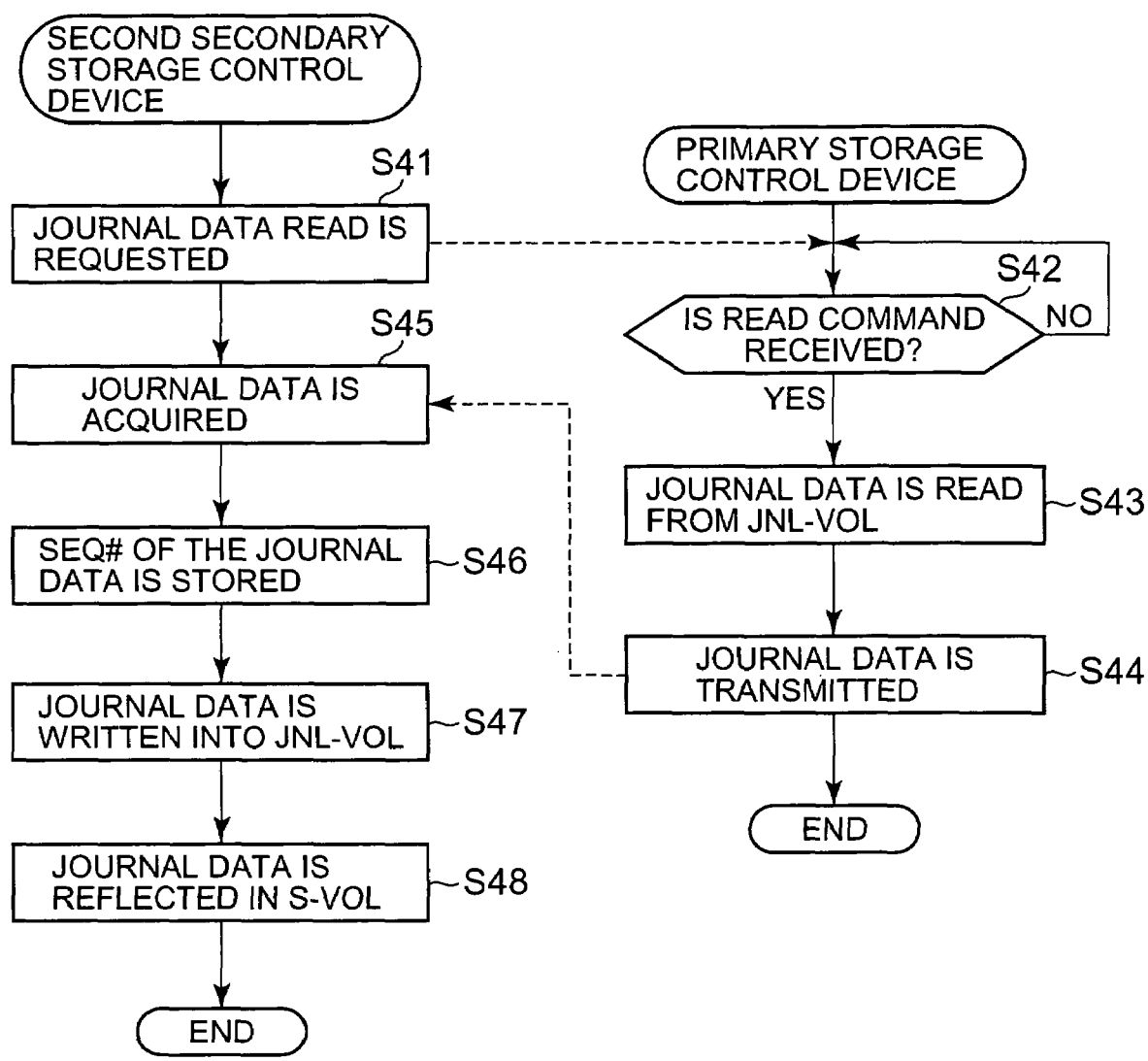
FIG. 13 is a flowchart illustrating the processing in which the second secondary storage control device acquires journal data by an asynchronous read method.

FIG. 13 is a flowchart illustrating the data update processing based on the second secondary storage control device 300. The second secondary storage control device 300 can request the primary storage control device 100 to read the journal data within a comparatively short period (S41).

If the primary storage control device 100 receives a read request from the second secondary storage control device 300 (S42: YES), it reads the journal data from the primary journal volume 131 (S43) and transmits the journal data that was read out to the second secondary storage control device 300 (S44). Here, the primary storage control device 100 supplies to the second secondary storage control device 300 the journal data for which the maintenance number following the newest maintenance number held by the second secondary storage control device 300 has been set. Journal data that has already been transmitted are not transmitted to the second secondary storage control device 300.

If the second secondary storage control device 300 acquires the journal data from the primary storage control device 100 (S45), the maintenance number that has been set in this journal data is stored, e.g., in the common memory (S46).

The second secondary storage control device 300 then writes the journal data to the secondary journal volume 331 (S47). The second secondary storage control device 300 reflects the journal data stored in the secondary journal volume 331 in the second secondary data volume at an appropriate timing (S48). Thus, the second secondary storage control device 300 does not have to update the second secondary data volume simultaneously with acquiring the journal data from the primary storage control device 100.

Figure 14:
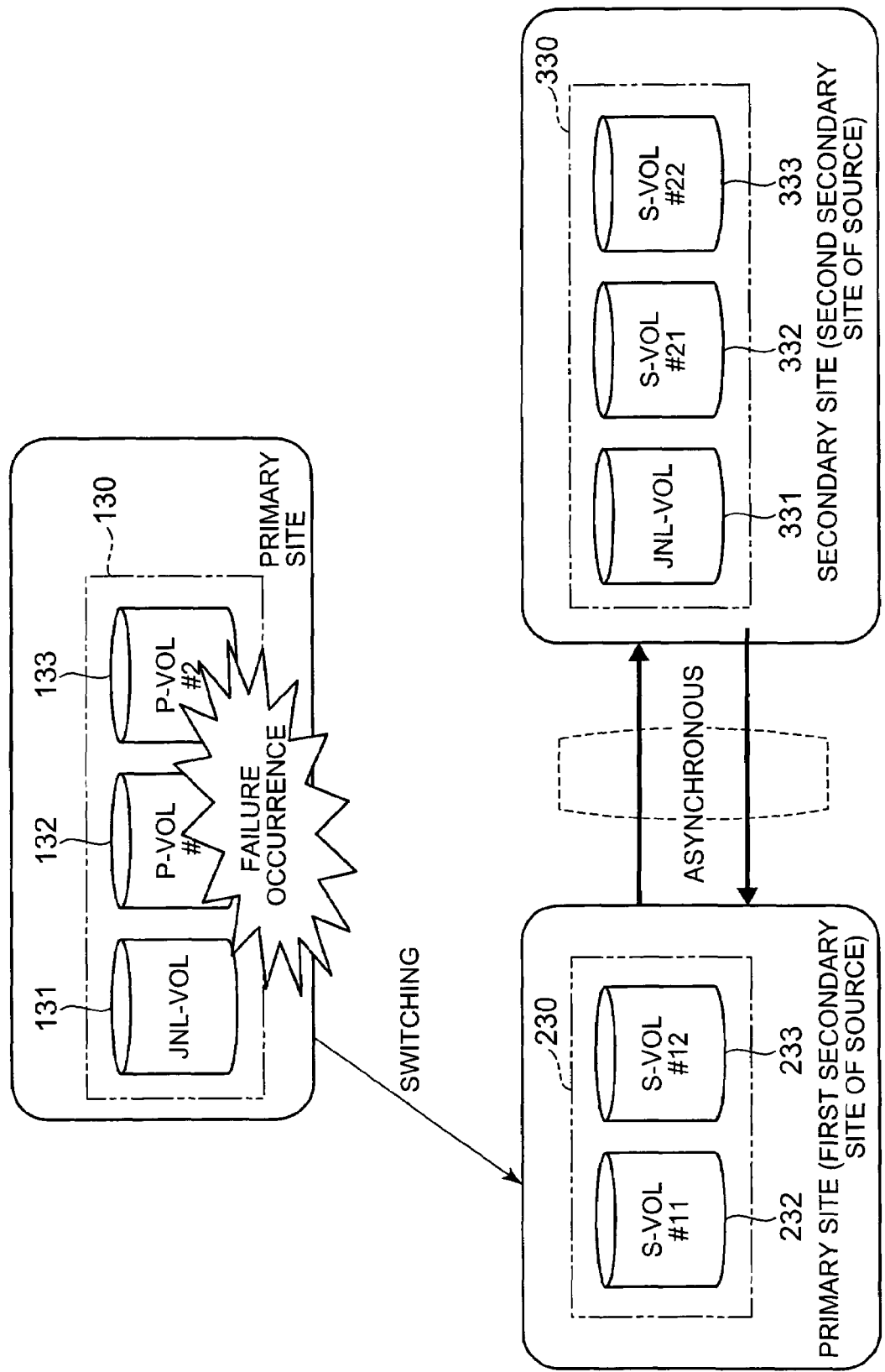
FIG. 14 is an explanatory drawing illustrating switching of the main storage control device from the primary storage control device to the first secondary storage control device.

The case of switching from the primary storage control device 100 to the first secondary storage control device 200 due to occurrence, e.g., of a failure, will be explained below. FIG. 14 is an explanatory drawing illustrating the switching from the primary storage control device 100 to the first secondary storage control device 200.

As described hereinabove, the internal structure of the primary storage control device 100 is made both physically and logically redundant to inhibit the loss of data. However, the primary storage control device 100 can be stopped by a failure such as an accident.

If a failure occurs in the primary storage control device 100 and it stops, the first secondary storage control device 200 is selected as the main storage control device instead of the primary storage control device 100. The first secondary storage control device 200 becomes a new primary storage control device, and the site where the first secondary storage control device 200 is located becomes the primary site.

Each first secondary data volume 232, 233 of the first secondary storage control device 200 becomes the respective primary data volume and forms copy pairs with each second secondary data volume 332, 333 of the second secondary storage control device 300. Here, the first secondary data volumes 232, 233 and second secondary data volumes 332, 333 form copy pairs by the so-called asynchronous read method. From the viewpoint of the second secondary storage control device 300, the acquisition source of journal data of the second secondary storage control device 300 is switched from the primary storage control device 100 to the first secondary storage control device 200. However, the first secondary storage control device 200 does not hold the journal data, generates the journal data by the update information maintenance table T10 and first secondary data volumes 232, 233, and supplies the journal data to the second secondary storage control device 300.

Figure 15:
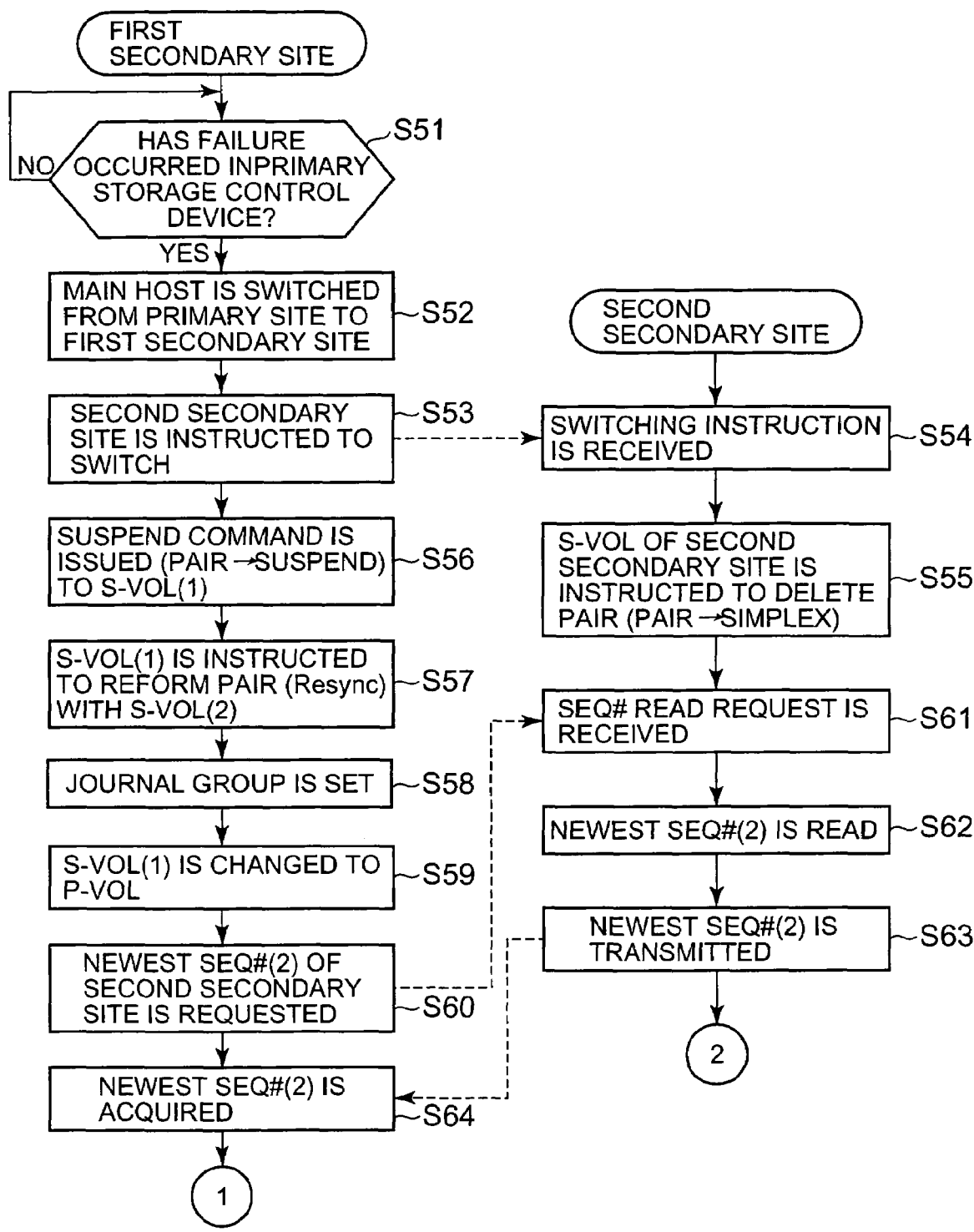
FIG. 15 is a flowchart illustrating the processing of switching from a primary site to a first secondary site.

Processing conducted in the case of switching the main storage control device will be described below based on the flowchart shown in FIG. 15. For example, if the host 10B or maintenance terminal 20B of the first secondary site detects that a failure has occurred in the primary storage control device 100 (S51: YES), the main host is switched from the host 10A of the primary site to the host 10B of the first secondary site (S52). For the sake of convenience of explanation, it will be assumed that the host 10B instructs the storage control devices, but the maintenance terminal 20B also may be used.

Switching of the main host can be conducted automatically or by manual operations of the user, for example, a system administrator. For example, a failure of the primary site is detected and switching is automatically conducted from the host 10A to the host 10B based on the termination of heart beat communication between the host 10A and host 10B. Furthermore, for example, switching can be conducted by manual operations following the switching instruction provided by electronic mail or telephone from the primary site administrator to the first secondary site administrator.

When the failure occurs only in the primary storage control device 100, the host 10A operates normally, and a communication route can be set between the host 10A and the first secondary storage control device 200, the host 10A can be still used as the main host. In this case, only the main storage control device is switched from the primary storage control device 100 to the first secondary storage control device 200. Here, the case will be explained where both the primary site host 10A and primary storage control device 100 stopped functioning due to accident or the like.

The host 10B of the first secondary site instructs the second secondary storage control device 300 of the second secondary site to switch (S53). If the second secondary storage control device 300 receives the switching instruction from the first secondary site (S54), it instructs the second secondary data volumes 332, 333 to delete copy pairs (S55). As a result, the second secondary data volumes 332, 333 cancel the copy pairs with respective primary data volumes 132, 133 and make a transition to a simplex state.

The host 10B of the first secondary site issues a suspend command to the first secondary data volumes 232, 233 (S56). As a result, the first secondary data volumes 232, 233 cancel copy pairs with primary data volumes 132, 133 and make a transition to a suspend state. Data update from the host 10B to the first secondary data volumes 232, 233 is managed by the update information maintenance table T10.

Thus, at this point in time, the host 10B can use the first secondary data volumes 232, 233. Because the first secondary data volumes 232, 233 hold the same contents as the primary data volumes 132, 133, the host 10B can rapidly restart data processing service.

The host 10B issues a Resync command to the first secondary data volumes 232, 233 (S57). Then, the host 10B changes the first secondary journal group to the primary journal group (S58) and changes the volume attribution of the first secondary volumes 232, 233 to respective primary data volumes (S59).

Then, the host 10B sends a request for the newest maintenance number relating to the second secondary journal group to the second secondary storage control device 300 via the first secondary storage control device 200 (S60). If the second secondary storage control device 300 receives this read request (S61), it reads the newest maintenance number relating to the second secondary journal group (S62) and transmits it to the first secondary storage control device 200 (S63).

Figure 16:
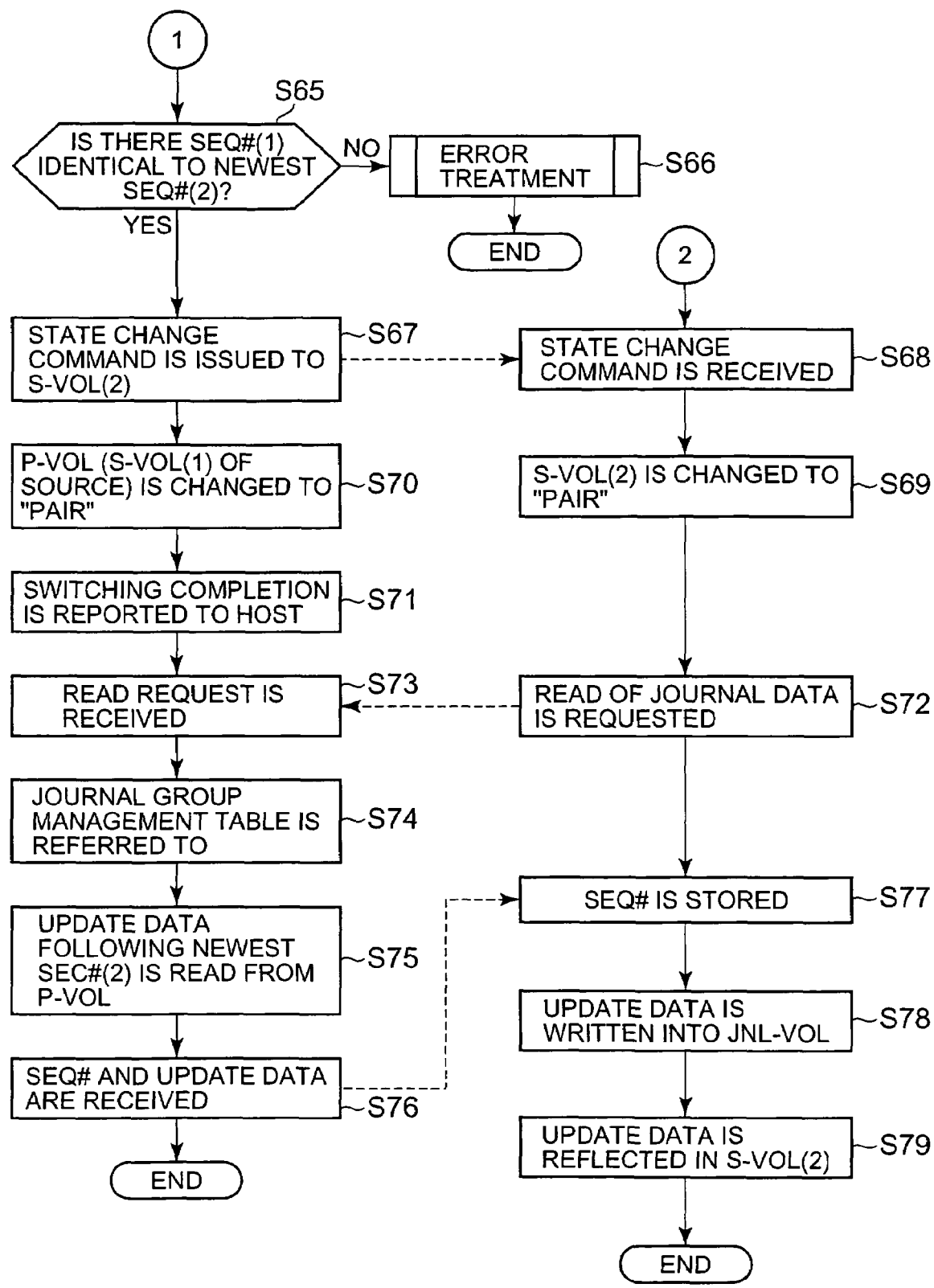
FIG. 16 is a flowchart following the flowchart shown in FIG. 15.

The first secondary storage control device 200 acquires the newest maintenance number relating to the second secondary journal group (S64). FIG. 16 is a flowchart of the processing that follows the processing illustrated by FIG. 15. The first secondary storage control device 200 determines whether or not the newest maintenance number relating to the second secondary journal group has been stored in the update information maintenance table T10 (S65). More specifically, it determines whether or not the newest maintenance number acquired from the second secondary storage control device 300 is present in the table managing the first secondary journal group (the first secondary journal group changed to the primary journal group) corresponding to this second secondary journal group.

When the newest maintenance number held in the second secondary storage control device 300 has not been registered in the journal group maintenance table (S65: NO), the first secondary data volumes 232, 233 and second secondary data volumes 332, 333 cannot be synchronized based on the journal data. Accordingly, the host 10B conducts the below-described error processing (S66).

When the newest maintenance number acquired from the second secondary storage control device 300 has been registered in the corresponding journal group maintenance table (S65: YES), the first secondary storage control device 200 issues a state change command to the second secondary data volumes 332, 333 (S67). If the second secondary storage control device 300 receives this state change command (S68), it changes the pair state of the second secondary data volumes 332, 333 to "pair" (S69).

Furthermore, after the first secondary storage control device 200 has issued a state change command to the second secondary data volumes 332, 333, it changes the pair state of each first secondary data volume 232, 233 to "pair" (S70). Switching from the storage control device 100 to the storage control device 200 is thereby normally completed, and switching completion is reported from the first secondary storage control device 200 to the host 10B (S71). Thus connecting the first secondary storage control device 200, which became the primary storage control device, with the second secondary storage control device 300 by an asynchronous read method makes it possible to complete switching within a short time.

Then, the second secondary storage control device 300 requests the first secondary storage control device 200 to read the journal data within a comparatively short period, as was conducted between it and the primary storage control device 100 prior to the failure occurrence (S72).

If the first secondary storage control device 200, which became the primary storage control device, receives this read request (S73), it refers to the journal group maintenance table (S74) and verifies the maintenance number following the newest maintenance number held in the second secondary storage control device 300. Thus, it verifies the maintenance number of the position where a difference appears between the first secondary data volumes 232, 233 and the second secondary data volumes 332, 333.

The first secondary storage control device 200 reads write data relating to the difference from the first secondary data volumes 232, 233 with the object of eliminating the difference between the first secondary data volumes 232, 233 and the second secondary data volumes 332, 333 (S75), associates a maintenance number with the write data and transmits them to the second secondary storage control device 300 (S76).

The second secondary 300 stores the maintenance number in the update information area of the journal volume 331 (S77) and also stores the received write data in the write data area of the journal volume 331 (S78). Then, the second secondary storage control device 300 reflects the write data stored in the journal volume 331 in the second secondary data volumes 332, 333 (S79).

Here, the maintenance number set for the write data that was the very last to be reflected becomes the restored maintenance number. When the second secondary storage control device 300 conducts a journal data read request, the restored maintenance number is clearly indicated as a purgeable maintenance number. As a result, the first secondary storage control device 200 can know the maintenance number that can be deleted. In a similar manner, in the primary storage control device 100 prior to failure occurrence, the journal data that has been stored in the primary journal volume 131 can be deleted based on the purgeable maintenance number contained in the journal data read request from the second secondary storage control device 300.

As described hereinabove, the first secondary storage control device 200 does not comprise a special volume for storing the journal data and is configured to read the write data from the first secondary data volume. Therefore, in the first secondary storage control device 200, even when the deletable maintenance number has been notified from the second secondary storage control device 300, the write data stored in the first secondary data volumes 232, 233 are not deleted.

Figure 17:
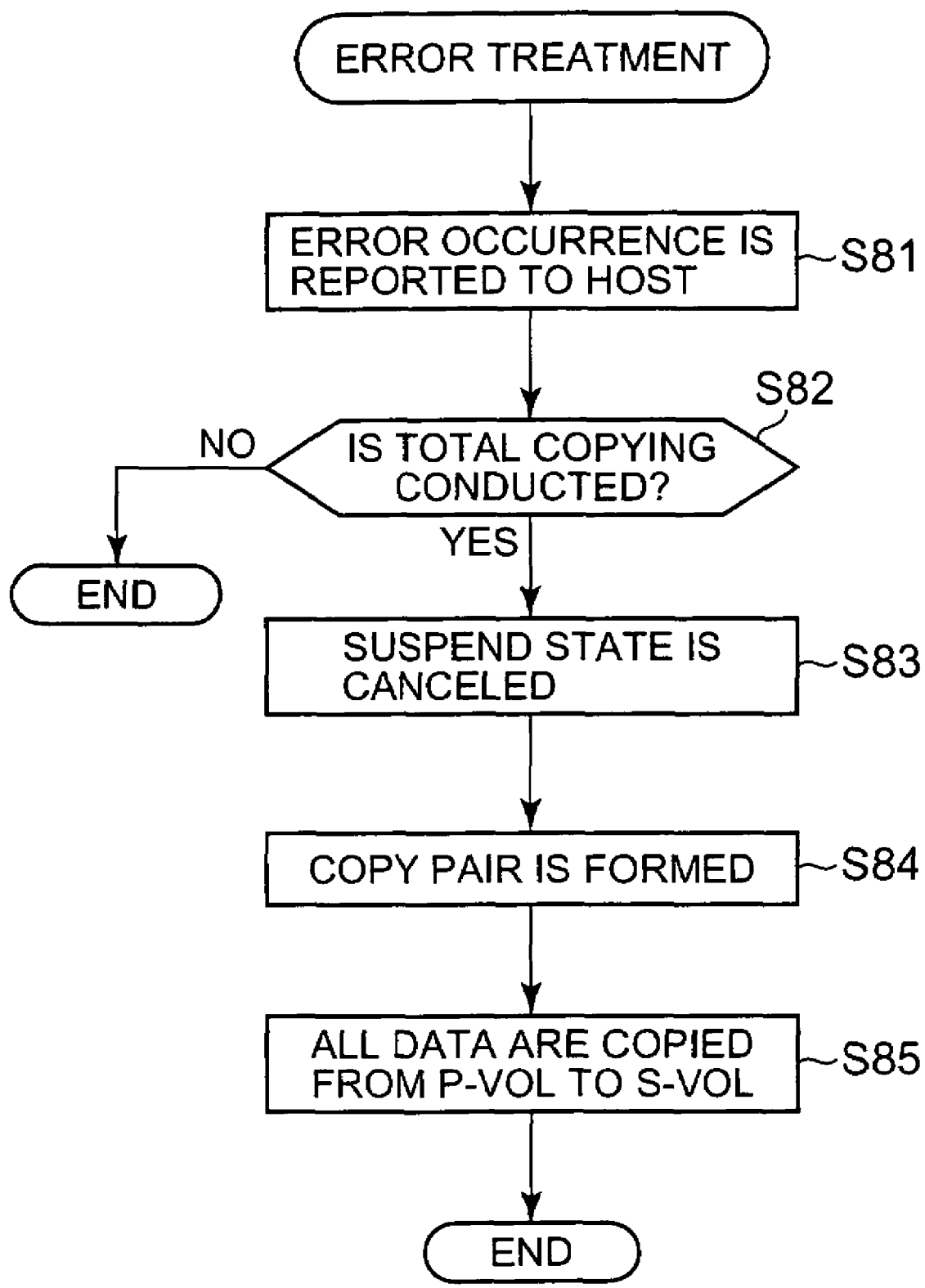
FIG. 17 is a flowchart illustrating in detail the error processing shown in FIG. 16.

The error processing shown in S66 in FIG. 16 will be explained below with reference to the flow chart of FIG. 17. The case where the newest maintenance number stored in the second secondary storage control device 300 has not been registered in the first secondary storage control device 200 is encountered, for example, when the read speed of journal data by the second secondary storage control device 300 does not follow the update frequency by the host and the journal data is overwritten with other journal data before the journal data is stored in the second secondary storage control device 300. In this case, the storage contents of the second secondary data volumes 332, 333 cannot be updated in the correct order.

Accordingly, the host 10B is notified about error occurrence (S81). The host 10B determines whether or not the total copying is conducted (S82). The total copying is the processing in which the entire storage contents of the copy source volume is written into the copy destination volume. Even when the differential maintenance has failed, conducting the total copying makes it possible to match the storage contents of the copy destination volume and copy source volume.

For example, the host 10B can determine the execution of total copying (S82: YES) when the start of total copying has been acknowledged by the user or when the execution of total copying has been designated in advance in the processing policy during error occurrence.

The host 10B cancels the suspend state of the first secondary data volumes 232, 233 (S83) and forms copy pairs of the first secondary data volumes 232, 233 and second secondary data volumes 332, 333 (S84). Then, the host 10B copies the entire data stored in the first secondary data volumes 232, 233 to the corresponding second secondary data volumes 332, 333 (S85). The update request from the host 10B can be stopped while the total copying is being conducted. When the cache memory of the second secondary storage control device 200 has a sufficient empty space, the update request from the host 10B can be also received.

FIG. 18 is an explanatory drawing illustrating a state transition during Resync request with respect to the primary data volume (including the case where the first secondary data volume became the primary data volume. Same hereinbelow). The stage of the primary data volume is plotted against the abscissa, and the state of the journal group is plotted against the ordinate in the figures. If a Resync command is issued, the state of the primary data volume changes from "Suspend" to pair. Similarly, if a Resync command is issued, the primary journal group (including the case where the first secondary journal group became the primary journal group. Same hereinbelow.) also changes from a "Termination" state to a "Start" state. The "Termination" state means a state where journal data are not generated, and the "Start" state indicates a state of generating the journal data.

Similarly, the state of the second secondary data volume and the state of the second secondary journal group during Resync request to the primary data volume also make a transition as shown in FIG. 18.

Because the present embodiment has the above-described configuration, it demonstrates the following effect. First, in the present embodiment the differential data were managed by using the update information maintenance table T10 (including T11 to T13) and the second secondary data volumes 232, 233, without generating journal data in the first secondary storage control device 200 or providing a special volume for holding the journal data. Therefore, the storage contents of the first secondary storage control device 200 and second secondary storage control device 300 can be matched with a comparatively simple configuration.

In the present embodiment, when the primary storage control device 100 was stopped, for example, by a failure, the first secondary storage control device 200 was considered as the primary storage control device and the first secondary storage control device 200 and second secondary storage control device 300 were connected by an asynchronous read method. Therefore, the operation of the storage system can be promptly started, the switching time can be shortened, and usability is increased even in a state where the storage contents of the first secondary data volumes 232, 233 that became the primary data volumes and the second secondary data volumes 332, 333 are not matched.

Embodiment 2

Figure 19:
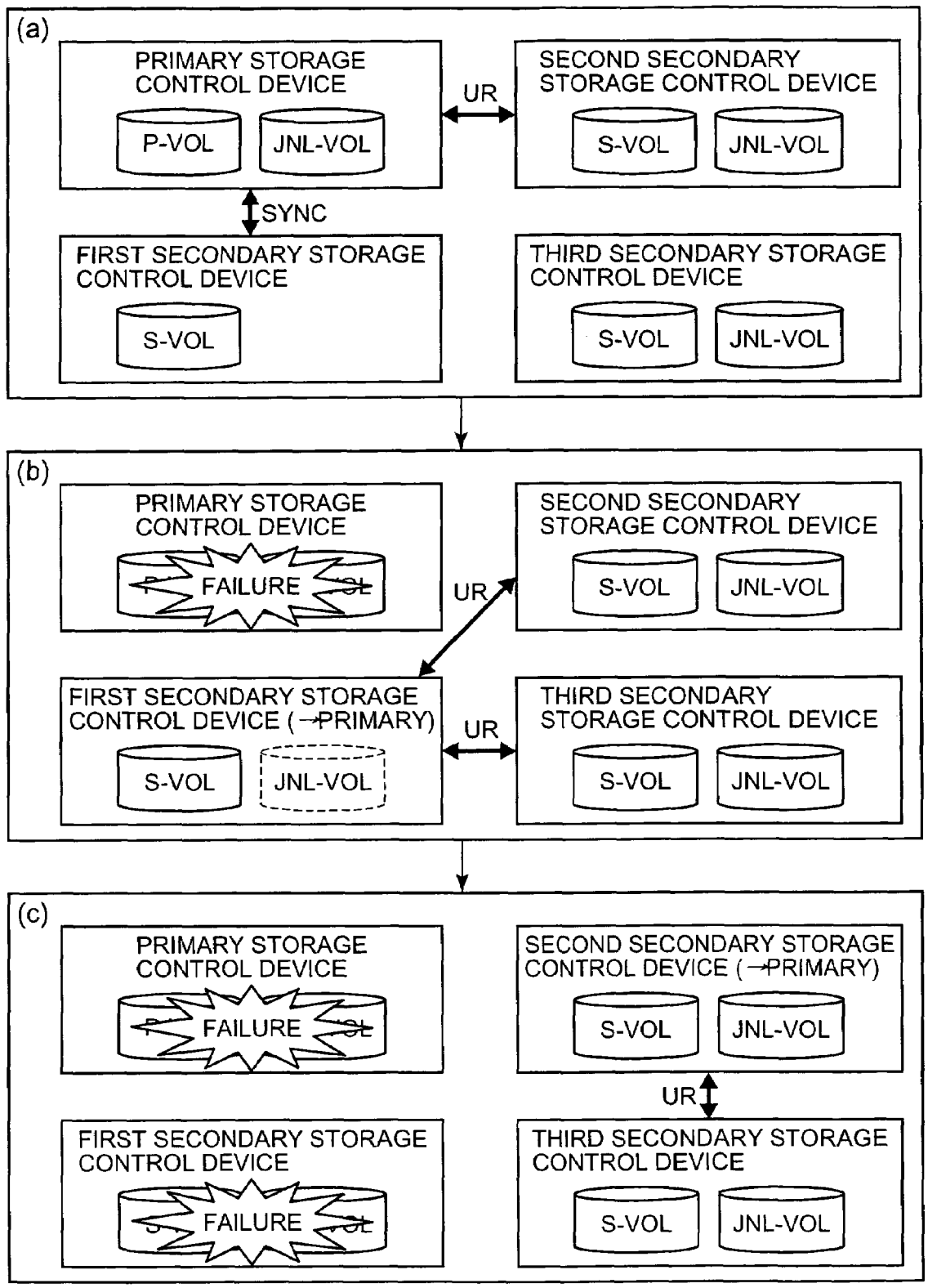
FIG. 19 is an explanatory drawing illustrating schematically the entire configuration of the storage system of a second working example. (a) illustrates the usual state, (b) illustrates the case where switching was made from the primary storage control device to the first secondary storage control device, and (c) illustrates the case where switching was made from the first secondary storage control device to the second secondary storage control device.

The second embodiment of the present invention will be explained based on FIG. 19. The below-described embodiments, including the present embodiment, are equivalent to modifications of the first embodiment. In the present embodiment, the redundancy of the storage system is improved by using four storage control devices.

FIG. 19(a) is an explanatory drawing illustrating the usual state. This storage system comprises a third secondary storage control device 400 in addition to the primary storage control device 100, first secondary storage control device 200, second secondary storage control device 300.

As was described in the first embodiment, the primary storage control device 100 and the first secondary storage control device 200 are connected by a synchronous method and the primary storage control device 100 and the second secondary storage control device 300 are connected by an asynchronous method.

FIG. 19(b) is an explanatory drawing illustrating the state where a failure occurred in the primary storage control device 100 and the storage control device was stopped. In this case, similarly to the first embodiment, the first secondary storage control device 200 becomes a primary storage control device and is connected to the second secondary storage control device 300 by an asynchronous read method. The first secondary storage control device 200 is connected to the third secondary storage control device 400 also by an asynchronous read method.

FIG. 19(c) is an explanatory drawing illustrating the state where a failure occurred in the first secondary storage control device 200 and the storage control device stopped. In this case, the second secondary storage control device 300 becomes a primary storage control device and is connected to the third secondary storage control device 400 by an asynchronous read method.

Thus, when a storage system is configured by using four storage control devices, the redundancy of the storage system can be ensured even when two failures occur one after another, and reliability of the system is further increased. The present invention is not limited to the case where four storage control devices are used, and can be also employed when five or more storage control devices are used.

Embodiment 3

The third embodiment will be explained based on FIG. 20. In the present embodiment, the storage control devices 100, 200, 300 do not hold the correspondence and relationship with each of the storage control devices 100, 200, 300, and the secondary storage control devices 200, 200 hold the correspondence and relationship only with the primary storage control device 100.

Figure 20:
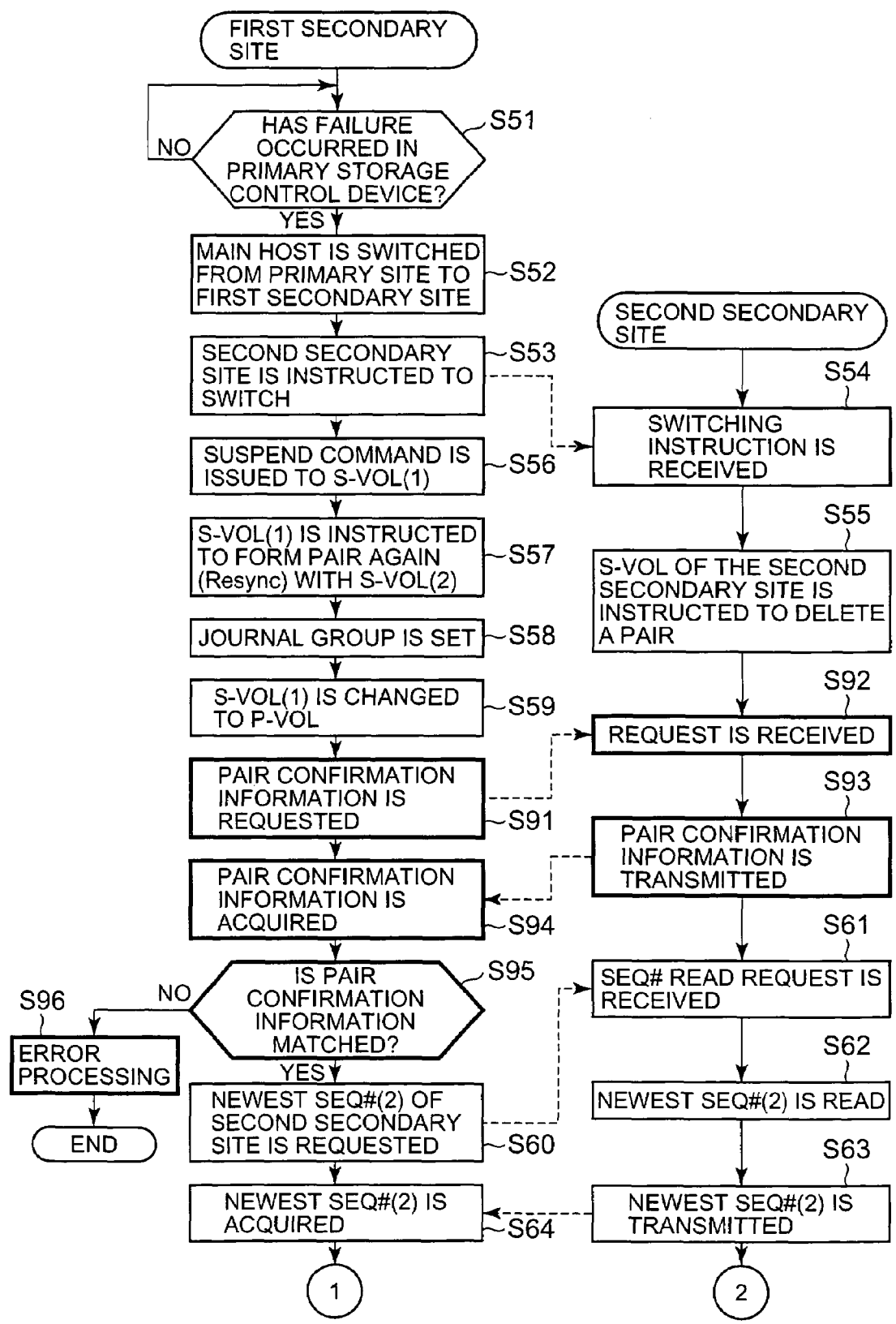
FIG. 20 is a flowchart illustrating part of switching processing executed by the storage system of a third working example.

FIG. 20 is a flowchart illustrating part of the processing executed in the storage system of the third embodiment. This flowchart corresponds to the flowchart explained with reference to FIG. 15 and the two flowcharts have common steps. The explanations of common steps is herein omitted and the explanation will be focused only on the steps specific to the third embodiment.

After step S59, the host 10B requests the transmission of pair confirmation information from the second secondary storage control device 300 (S91). The pair confirmation information is information for confirming the correspondence and relationship of the first secondary data volumes 232, 233 and second secondary data volumes 332, 333.

Here, examples of the pair confirmation information include a product number and a M.VOL number. The product number is a device identification number of the primary storage control device 100. The M.VOL number is the volume number of the other party volume corresponding to the second secondary data volumes 332, 333. Those device identification number of the primary storage control device 100 and the volume number of the other party volume corresponding to the second secondary data volumes 332, 333 are held by the second secondary storage control device 300.

If the second secondary storage control device 300 receives the pair confirmation information acquisition request (S92), it transmits the pair confirmation information to the first secondary storage control device 200 (S93). If the first secondary storage control device 200 acquires the pair confirmation information (S94), it determines whether or not this pair confirmation information matches the pair confirmation information that has been stored in advance in the first secondary storage control device 200 (S95).

When the former and latter pair confirmation information match each other (S95: YES), the second secondary storage control device 300 corresponds to the first secondary storage control device 200 and connection is possible. Here, the first secondary storage control device 200 executes S60 and subsequent steps. By contrast, when the former and latter pair confirmation information are not matched (S95: NO), the second secondary storage control device 300 does not correspond to the first secondary storage control device 200. Here, error processing is conducted (S96). In the error processing, for example, the user can be notified with an error message.

Thus, whether or not the first secondary storage control device 200 and second secondary storage control device 300 correspond to each other is confirmed based on the pair confirmation information, and using the configuration in which the two are connected makes it possible to delete the information volume of the pair maintenance tables T22, T23 managed by the secondary storage control devices 200, 300.

The present invention is not limited to the above-described preferred embodiments. Various changes and modifications obvious to a person skilled in the art can be made within the scope of the present invention. For example, SAN and LAN were explained as communication protocols, but they are not limiting and the present invention can be employed with other protocols such as iSCSI, ESCON (Trademark), and FICON (Trademark).

What is claimed is:

1. A storage system in which a second storage control device and a third storage control device are connected to a first storage control device, wherein the first storage control device comprises a first data volume, a first journal volume for managing the update history of the first data volume, and a first control unit which sets a management number for write data and generates journal data when an upper-level device writes the write data into the first data volume, stores the journal data in the first journal volume, associates the management number with the write data to be transmitted to the second storage control device, the second storage control device comprises a second data volume related with the first data volume and a second control unit which stores the write data received from the first control unit in the second data volume, associates the management number received from the first control unit with a storage position in the second data volume of the write data to be stored in an update management table, the third storage control device comprises a third data volume related with the first data volume, a second journal volume related with the first journal volume, and a third control unit which reads the journal data from the first journal volume and stores the journal data in the second journal volume and updates the storage contents of the third data volume based on the journal data stored in the second journal volume, when a copy pair is formed by taking the second data volume as a primary volume and the third data volume as a secondary volume, the second control unit notifies the upper-level device to the effect that switching from the first storage control device to the second storage control device has been completed, and in the case of switching from the first storage control device to the second storage control device, the second control unit transmits to the third control unit the management number following the newest management number that is held in the third control unit and write data corresponding to the storage control device number.

2. The storage system according to claim 1, wherein the first, second and third control units get hold in advance of a correspondence and relationship of the first, second, and third data volume and a correspondence and relationship of the first and second journal volumes.

3. The storage system according to claim 1, wherein the update management table is configured by associating a management number, a journal group number, a volume number specifying the second data volume, a storage destination address of the write data stored in the second data volume, and a data size of the write data.

4. A storage system in which a second storage control device and a third storage control device are connected to a first storage control device, wherein the first storage control device comprises a first data volume, a first journal volume for managing the update history of the first data volume, and a first control unit which sets a management number for write data and generates journal data when an upper-level device writes the write data into the first data volume, stores the journal data in the first journal volume. associates the management number with the write data to be transmitted to the second storage control device, the second storage control device comprises a second data volume related with the first data volume and a second control unit which stores the write data received from the first control unit in the second data volume, associates the management number received from the first control unit with a storage position in the second data volume of the write data to be stored in an update management table, the third storage control device comprises a third data volume related with the first data volume, a second journal volume related with the first journal volume, and a third control unit which reads the journal data from the first journal volume and stores the journal data in the second journal volume and updates the storage contents of the third data volume based on the journal data stored in the second journal volume, when a copy pair is formed by taking the second data volume as a primary volume and the third data volume as a secondary volume, the second control unit notifies the upper-level device to the effect that switching from the first storage control device to the second storage control device has been completed, and the second control unit allows the switching from the first storage control device to the second storage control device when the newest management number held by the third control unit has been registered in the update management table.

5. The storage system according to claim 4, wherein the second control unit copies the entire storage contents of the second data volume into the third data volume when the newest management number has not been registered in the update management table.

6. The storage system according to claim 4, wherein the first, second and third control units get hold in advance of a correspondence and relationship of the first, second, and third data volumes and a correspondence and relationship of the first and second journal volumes.

7. The storage system according to claim 4, wherein the update management table is configured by associating a management number, a journal group number, a volume number specifying the second data volume, a storage destination address of the write data stored in the second data volume, and a data size of the write data.

8. A storage system in which a second storage control device and a third storage control device are connected to a first storage control device , wherein the first storage control device comprises a first data volume, a first journal volume for managing the update history of the first data volume, and a first control unit which sets a management number for write data and generates journal data when an upper-level device writes the write data into the first data volume, stores the journal data in the first journal volume, associates the management number with the write data to be transmitted to the second storage control device, the second storage control device comprises a second data volume related with the first data volume and a second control unit which stores the write data received from the first control unit in the second data volume, associates the management number received from the first control unit with a storage position in the second data volume of the write data to be stored in an update management table.

the third storage control device comprises a third data volume related with the first data volume, a second journal volume related with the first journal volume, and a third control unit which reads the journal data from the first journal volume and stores the journal data in the second journal volume and updates the storage contents of the third data volume based on the journal data stored in the second journal volume, when a copy pair is formed by taking the second data volume as a primary volume and the third data volume as a secondary volume, the second control unit notifies the upper-level device to the effect that switching from the first storage control device to the second storage control device has been completed, the second control unit gets hold in advance of the correspondence and relationship of the first data volume and the second data volume, the third control unit gets hold in advance of the correspondence and relationship of the first data volume and the third data volume and a correspondence and relationship of the first journal volume and the second journal volume, and when switching is made from the first storage control device to the second storage control device, the second control unit acquires confirmation information for confirming the correspondence and relationship of the second data volume and the third data volume from the third control unit and forms the copy pair of the second data volume and the third data volume based on the acquired confirmation information.

9. The storage system according to claim 8, wherein the first, second and third control units get hold in advance of a correspondence and relationship of the first, second, and third data volumes and a correspondence and relationship of the first and second journal volumes.

10. The storage system according to claim 8, wherein the update management table is configured by associating a management number, a journal group number, a volume number specifying the second data volume, a storage destination address of the write data stored in the second data volume, and a data size of the write data.

11. A storage system management method in which a second storage control device and a third storage control device are connected to a first storage control device, the method comprising the steps of:

setting a management number for write data and generating journal data when an upper-level device wrote the write data to a first data volume of the first storage control device:

storing the generated journal data in a first journal volume of the first storage control device:

associating the write data and the management number to be transmitted from the first storage control device to the second storage control device:

storing write data transmitted from the first storage control device to the second storage control device in the second data volume of the second storage control device;

associating a storage position in which the write data is stored in the second data volume and the management number to be registered in an update management table;

accessing the first storage control device from the third storage control device when the prescribed timing has arrived, and acquiring the journal data stored in the first journal volume:

storing the acquired journal data in a second journal volume of the third storage control device:

updating the storage contents of a third data volume of the third storage control device based on the journal data stored in the second journal volume:

monitoring whether or not a failure has occurred in the first storage control device;

forming a copy pair of the second data volume as a primary volume and the third data volume as a secondary volume when a failure has occurred in the first storage control device;

notifying the upper-level device to the effect that switching from the first storage control device to the second storage control device has been completed when the copy pair is formed; and transmitting a management number following the newest management number held by the third storage control device and write data corresponding to the management number from the second storage control device to the third storage control device in response to a request from the third storage control device.

12. The storage system management method according to claim 11, wherein the update management table is configured by associating a management number, a journal group number, a volume number specifying the second data volume, a storage destination address of the write data stored in the second data volume, and a data size of the write data.

* * * * *